(12) United States Patent
Coenegracht et al.

(10) Patent No.: US 12,117,658 B2
(45) Date of Patent: Oct. 15, 2024

(54) FIBER OPTIC CABLE ANCHORING DEVICE FOR USE WITH FIBER OPTIC CONNECTORS AND METHODS OF USING THE SAME

(71) Applicants: CommScope Connectivity Belgium BVBA, Kessel-Lo (BE); CommScope Czech Republic s.r.o., Brno (CZ)

(72) Inventors: Philippe Coenegracht, Hasselt (BE); Jan Vozdecky, Brno (CZ)

(73) Assignees: COMMSCOPE CONNECTIVITY BELGIUM BVBA, Kessel-Lo (BE); COMMSCOPE CZECH REPUBLIC S.R.O., Brno (CZ)

( * ) Notice: Subject to any disclaimer, the term of this patent is extended or adjusted under 35 U.S.C. 154(b) by 19 days.

(21) Appl. No.: 17/329,890

(22) Filed: May 25, 2021

(65) Prior Publication Data

US 2021/0349271 A1 Nov. 11, 2021

Related U.S. Application Data

(60) Division of application No. 16/574,596, filed on Sep. 18, 2019, now abandoned, which is a continuation of
(Continued)

(51) Int. Cl.
 *G02B 6/38* (2006.01)
(52) U.S. Cl.
 CPC ......... *G02B 6/3889* (2013.01); *G02B 6/3821* (2013.01); *G02B 6/3849* (2013.01); *G02B 6/3871* (2013.01); *G02B 6/387* (2013.01)
(58) Field of Classification Search
 CPC .. G02B 6/3887; G02B 6/3821; G02B 6/3825; G02B 6/3849; G02B 6/387; G02B 6/3889; G02B 6/3861; G02B 6/3871
 See application file for complete search history.

(56) References Cited

U.S. PATENT DOCUMENTS 2,950,338 A 8/1960 Taylor
4,140,366 A 2/1979 Makuch et al.
(Continued)

FOREIGN PATENT DOCUMENTS

DE 35 37 684 A1 4/1987
DE 10 2004 049 697 A1 4/2006
(Continued)

OTHER PUBLICATIONS

International Search Report and Written Opinion for International Application No. PCT/EP2014/063265 dated Oct. 14, 2014 (18 pages).
(Continued)

*Primary Examiner* — Michelle R Connelly
*Assistant Examiner* — Mary A El-Shammaa
(74) *Attorney, Agent, or Firm* — Merchant & Gould. P.C.

(57) ABSTRACT

A fiber-optic connector housing (50) and cable (20, 20') are attached together by an anchor (100, 200). The anchor includes a one-piece main body, a passage (110, 210), and an injection port (130, 230). The passage extends between first (102, 202) and second ends (104, 204) of the anchor. Strength members (40, 40') of the cable are secured within the passage by a bonding material (90) and are thereby anchored to the connector housing. A proximal end (54) of the connector housing includes first (60) and second housing components (70) which capture the anchor. The passage passes through an optical fiber (30) of the cable. The passage includes first (120, 220), second (170, 270), and third portions (180, 280). The first portion radially positions the optical fiber. The second portion receives the bonding material and the strength members. The third portion receives a jacket (26, 26') of the fiber optic cable. The injection port delivers the bonding material to the passage. The anchor
(Continued)

may further include retention tabs (150) that fit within corresponding receivers (62, 72) within the connector.

22 Claims, 19 Drawing Sheets

Related U.S. Application Data application No. 14/901,226, filed as application No. PCT/EP2014/063265 on Jun. 24, 2014, now Pat. No. 10,444,443.

(60) Provisional application No. 61/840,353, filed on Jun. 27, 2013.

(56) References Cited

U.S. PATENT DOCUMENTS

| | | |
|---|---|---|
| 4,140,367 A | 2/1979 | Makuch et al. |
| 4,142,776 A | 3/1979 | Cherin et al. |
| 4,174,882 A | 11/1979 | McCartney |
| 4,225,214 A | 9/1980 | Hodge et al. |
| 4,268,115 A | 5/1981 | Slemon et al. |
| 4,279,467 A | 7/1981 | Borsuk et al. |
| 4,291,943 A | 9/1981 | Binek et al. |
| 4,339,171 A | 7/1982 | Makuch et al. |
| 4,354,731 A | 10/1982 | Mouissie |
| 4,447,120 A | 5/1984 | Borsuk |
| 4,448,478 A | 5/1984 | Matthews |
| 4,515,434 A | 5/1985 | Margolin et al. |
| 4,611,887 A | 9/1986 | Glover et al. |
| 4,615,581 A | 10/1986 | Morimoto |
| 4,634,214 A | 1/1987 | Cannon, Jr. et al. |
| 4,648,688 A | 3/1987 | Ashman et al. |
| 4,684,205 A | 8/1987 | Margolin et al. |
| 4,687,291 A | 8/1987 | Stape et al. |
| 4,705,352 A | 11/1987 | Margolin et al. |
| 4,715,675 A | 12/1987 | Kevern et al. |
| 4,725,120 A | 2/1988 | Parzygnat |
| 4,787,706 A | 11/1988 | Cannon, Jr. et al. |
| 4,793,683 A | 12/1988 | Cannon, Jr. et al. |
| 4,815,810 A | 3/1989 | Betzler et al. |
| 4,820,185 A | 4/1989 | Moulin |
| 4,846,564 A | 7/1989 | Caron et al. |
| 4,854,664 A | 8/1989 | McCartney |
| 4,902,238 A | 2/1990 | Iacobucci |
| 4,907,853 A | 3/1990 | Hiratsuka |
| 4,961,623 A | 10/1990 | Midkiff et al. |
| 4,964,688 A | 10/1990 | Caldwell et al. |
| 4,974,925 A | 12/1990 | Troutman et al. |
| 4,979,792 A | 12/1990 | Weber et al. |
| 4,984,865 A | 1/1991 | Lee et al. |
| 5,016,968 A | 5/1991 | Hammond et al. |
| 5,042,901 A | 8/1991 | Merriken et al. |
| 5,076,656 A | 12/1991 | Briggs et al. |
| 5,096,276 A | 3/1992 | Gerace et al. |
| 5,101,463 A | 3/1992 | Cubukciyan et al. |
| 5,104,242 A | 4/1992 | Ishikawa |
| 5,121,458 A | 6/1992 | Nilsson et al. |
| 5,123,071 A | 6/1992 | Mulholland et al. |
| 5,129,023 A | 7/1992 | Anderson et al. |
| 5,134,677 A | 7/1992 | Leung et al. |
| 5,136,672 A | 8/1992 | Mulholland et al. |
| 5,142,601 A | 8/1992 | Shibata et al. |
| 5,157,749 A | 10/1992 | Briggs et al. |
| 5,166,995 A | 11/1992 | Briggs et al. |
| 5,202,942 A | 4/1993 | Collins et al. |
| 5,210,810 A | 5/1993 | Darden et al. |
| 5,212,752 A | 5/1993 | Stephenson et al. |
| 5,214,731 A | 5/1993 | Chang et al. |
| 5,214,732 A | 5/1993 | Beard et al. |
| 5,214,830 A | 6/1993 | Rozycki |
| 5,222,169 A | 6/1993 | Chang et al. |
| 5,259,052 A | 11/1993 | Briggs et al. |
| 5,263,105 A | 11/1993 | Johnson et al. |
| 5,265,181 A | 11/1993 | Chang |
| 5,267,342 A | 11/1993 | Takahashi et al. |
| 5,268,982 A | 12/1993 | Schaffer et al. |
| 5,271,080 A | 12/1993 | Hopper et al. |
| 5,276,750 A | 1/1994 | Manning |
| 5,283,848 A | 2/1994 | Abendschein et al. |
| 5,293,581 A | 3/1994 | DiMarco |
| 5,293,582 A | 3/1994 | Beard et al. |
| 5,313,540 A | 5/1994 | Ueda et al. |
| 5,315,679 A | 5/1994 | Baldwin et al. |
| 5,317,663 A | 5/1994 | Beard et al. |
| 5,363,459 A | 11/1994 | Hultermans |
| 5,367,594 A | 11/1994 | Essert et al. |
| 5,390,270 A | 2/1995 | Hanzawa et al. |
| 5,392,373 A | 2/1995 | Essert |
| 5,394,497 A | 2/1995 | Erdman et al. |
| 5,418,874 A | 5/1995 | Carlisle et al. |
| 5,428,703 A | 6/1995 | Lee |
| 5,450,517 A | 9/1995 | Essert |
| 5,465,313 A | 11/1995 | Belenkiy et al. |
| 5,475,782 A | 12/1995 | Ziebol |
| 5,481,634 A | 1/1996 | Anderson et al. |
| 5,548,677 A | 8/1996 | Kakii et al. |
| 5,569,050 A | 10/1996 | Lloyd |
| 5,577,145 A | 11/1996 | Musk |
| 5,590,229 A | 12/1996 | Goldman et al. |
| 5,633,970 A | 5/1997 | Olson et al. |
| 5,636,306 A | 6/1997 | Mock et al. |
| 5,638,474 A | 6/1997 | Lampert et al. |
| 5,668,906 A | 9/1997 | Yamamura et al. |
| 5,682,450 A | 10/1997 | Patterson et al. |
| 5,682,451 A | 10/1997 | Lee et al. |
| 5,715,342 A | 2/1998 | Nodfelt et al. |
| 5,732,174 A | 3/1998 | Carpenter et al. |
| 5,751,874 A | 5/1998 | Chudoba |
| 5,778,122 A | 7/1998 | Giebel et al. |
| 5,806,175 A | 9/1998 | Underwood |
| 5,809,192 A | 9/1998 | Manning et al. |
| 5,862,289 A | 1/1999 | Walter et al. |
| 5,887,095 A | 3/1999 | Nagase |
| 5,892,870 A | 4/1999 | Fingler et al. |
| 5,896,477 A | 4/1999 | Stephenson et al. |
| 5,905,832 A | 5/1999 | Afille et al. |
| 5,909,526 A | 6/1999 | Roth et al. |
| 5,920,669 A | 7/1999 | Knecht et al. |
| 5,923,804 A | 7/1999 | Rosson |
| 5,923,805 A | 7/1999 | Anderson et al. |
| 5,940,559 A | 8/1999 | Noll |
| 5,946,436 A | 8/1999 | Takashi |
| 5,971,625 A | 10/1999 | Lu |
| 5,980,118 A | 11/1999 | Henningsson et al. |
| 5,984,532 A | 11/1999 | Tamaki et al. |
| 5,993,070 A | 11/1999 | Tamekuni et al. |
| 5,993,071 A | 11/1999 | Hultermans |
| 6,022,150 A | 2/2000 | Erdman et al. |
| 6,079,881 A | 6/2000 | Roth |
| 6,149,313 A | 11/2000 | Giebel et al. |
| 6,149,451 A | 11/2000 | Weber |
| 6,151,432 A | 11/2000 | Nakajima et al. |
| RE37,028 E | 1/2001 | Cooke et al. |
| 6,173,097 B1 | 1/2001 | Throckmorton et al. |
| 6,178,283 B1 | 1/2001 | Weigel |
| 6,179,475 B1 | 1/2001 | Takamatsu et al. |
| 6,179,482 B1 | 1/2001 | Takizawa et al. |
| 6,186,670 B1 | 2/2001 | Austin et al. |
| 6,188,822 B1 | 2/2001 | McAlpine et al. |
| RE37,079 E | 3/2001 | Stephenson et al. |
| RE37,080 E | 3/2001 | Stephenson et al. |
| 6,206,579 B1 | 3/2001 | Selfridge et al. |
| 6,224,270 B1 | 5/2001 | Nakajima et al. |
| 6,234,683 B1 | 5/2001 | Waldron et al. |
| 6,234,685 B1 | 5/2001 | Carlisle et al. |
| 6,254,278 B1 | 7/2001 | Andrews et al. |
| 6,261,006 B1 | 7/2001 | Selfridge |
| 6,264,374 B1 | 7/2001 | Selfridge et al. |
| 6,298,190 B2 | 10/2001 | Waldron et al. |
| 6,302,594 B1 | 10/2001 | Lee |
| 6,305,849 B1 | 10/2001 | Roehrs et al. |
| 6,350,063 B1 | 2/2002 | Gilliland et al. |

(56) References Cited

U.S. PATENT DOCUMENTS

| | | |
|---|---|---|
| 6,357,929 B1 | 3/2002 | Roehrs et al. |
| 6,371,660 B1 | 4/2002 | Roehrs et al. |
| 6,379,054 B2 | 4/2002 | Throckmorton et al. |
| 6,419,399 B1 | 7/2002 | Loder et al. |
| 6,419,402 B1 | 7/2002 | Zimmel |
| 6,422,764 B1 | 7/2002 | Marrs |
| 6,427,035 B1 | 7/2002 | Mahony |
| 6,428,215 B1 | 8/2002 | Nault |
| 6,431,783 B2 | 8/2002 | Nakajima et al. |
| 6,435,732 B1 | 8/2002 | Asao et al. |
| 6,461,057 B2 | 10/2002 | Chen |
| 6,466,725 B2 | 10/2002 | Battey et al. |
| 6,496,641 B1 | 12/2002 | Mahony |
| 6,508,594 B1 | 1/2003 | Bruland |
| 6,522,804 B1 | 2/2003 | Mahony |
| 6,539,147 B1 | 3/2003 | Mahony |
| 6,540,410 B2 | 4/2003 | Childers et al. |
| 6,542,674 B1 | 4/2003 | Gimblet |
| 6,546,175 B1 | 4/2003 | Wagman et al. |
| 6,550,977 B2 | 4/2003 | Hizuka |
| 6,568,861 B2 | 5/2003 | Benner et al. |
| 6,575,640 B2 | 6/2003 | Connelly et al. |
| 6,579,014 B2 | 6/2003 | Melton et al. |
| 6,599,026 B1 | 7/2003 | Fahrnbauer et al. |
| 6,614,980 B1 | 9/2003 | Mahony et al. |
| 6,619,697 B2 | 9/2003 | Griffioen et al. |
| 6,619,859 B1 | 9/2003 | Minamino et al. |
| 6,625,375 B1 | 9/2003 | Mahony |
| 6,629,782 B2 | 10/2003 | McPhee et al. |
| 6,648,520 B2 | 11/2003 | McDonald et al. |
| 6,652,156 B2 | 11/2003 | Shinagawa et al. |
| 6,655,851 B1 | 12/2003 | Lee |
| 6,663,292 B1 | 12/2003 | Shirakawa |
| 6,668,127 B1 | 12/2003 | Mahony |
| 6,672,774 B2 | 1/2004 | Theuerkorn et al. |
| 6,678,448 B2 | 1/2004 | Moisei et al. |
| 6,685,361 B1 | 2/2004 | Rubino et al. |
| 6,695,489 B2 | 2/2004 | Nault |
| 6,702,478 B2 | 3/2004 | Inagaki et al. |
| 6,705,764 B2 | 3/2004 | Shang |
| 6,714,710 B2 | 3/2004 | Gimblet |
| 6,729,773 B1 | 5/2004 | Finona et al. |
| 6,738,555 B1 | 5/2004 | Cooke et al. |
| 6,739,759 B1 | 5/2004 | Seeley |
| 6,767,141 B1 | 7/2004 | Dudek et al. |
| 6,778,743 B1 | 8/2004 | Kordahi et al. |
| 6,783,281 B2 | 8/2004 | Cheng |
| 6,785,450 B2 | 8/2004 | Wagman et al. |
| 6,789,950 B1 | 9/2004 | Loder et al. |
| 6,809,265 B1 | 10/2004 | Gladd et al. |
| 6,816,662 B2 | 11/2004 | Doss et al. |
| 6,817,902 B2 | 11/2004 | Bernardi et al. |
| 6,821,024 B2 | 11/2004 | Bates, III |
| 6,832,856 B2 | 12/2004 | Chiu et al. |
| 6,848,836 B2 | 2/2005 | Ueda et al. |
| 6,854,895 B2 | 2/2005 | Coffey et al. |
| 6,863,446 B2 | 3/2005 | Ngo |
| 6,899,467 B2 | 5/2005 | McDonald et al. |
| 6,909,821 B2 | 6/2005 | Ravasio et al. |
| 6,916,120 B2 | 7/2005 | Zimmel et al. |
| 6,918,703 B2 | 7/2005 | Chen et al. |
| 6,918,704 B2 | 7/2005 | Marrs et al. |
| 6,962,445 B2 | 11/2005 | Zimmel et al. |
| 6,974,265 B2 | 12/2005 | Chiu et al. |
| 7,011,454 B2 | 3/2006 | Caveney et al. |
| 7,025,507 B2 | 4/2006 | de Marchi |
| 7,035,513 B2 | 4/2006 | Mohler et al. |
| 7,044,650 B1 | 5/2006 | Tran et al. |
| 7,050,692 B2 | 5/2006 | Harlan et al. |
| 7,074,066 B2 | 7/2006 | Pepe |
| 7,076,144 B2 | 7/2006 | Loder et al. |
| 7,079,734 B2 | 7/2006 | Seddon et al. |
| 7,090,406 B2 | 8/2006 | Melton et al. |
| 7,090,407 B2 | 8/2006 | Melton et al. |
| 7,093,983 B2 | 8/2006 | Taira et al. |
| 7,111,990 B2 | 9/2006 | Melton et al. |
| 7,113,679 B2 | 9/2006 | Melton et al. |
| 7,114,857 B1 | 10/2006 | Kayner et al. |
| 7,121,731 B2 | 10/2006 | Weynant et al. |
| 7,121,732 B2 | 10/2006 | Pimpinella et al. |
| 7,137,742 B2 | 11/2006 | Theuerkorn et al. |
| 7,146,090 B2 | 12/2006 | Vo et al. |
| 7,150,567 B1 | 12/2006 | Luther et al. |
| 7,165,893 B2 | 1/2007 | Schmitz |
| 7,175,352 B2 | 2/2007 | De Marchi |
| 7,178,990 B2 | 2/2007 | Caveney et al. |
| 7,182,522 B2 | 2/2007 | Sasaki et al. |
| 7,184,634 B2 | 2/2007 | Hurley et al. |
| 7,201,518 B2 | 4/2007 | Holmquist |
| 7,204,644 B2 | 4/2007 | Barnes et al. |
| 7,206,482 B2 | 4/2007 | Rhyne et al. |
| 7,207,727 B2 | 4/2007 | Tran et al. |
| 7,210,855 B2 | 5/2007 | Rossi et al. |
| 7,213,975 B2 | 5/2007 | Khemakhem et al. |
| 7,220,061 B2 | 5/2007 | De Marchi |
| 7,228,047 B1 | 6/2007 | Szilagyi et al. |
| 7,234,875 B2 | 6/2007 | Krowiak et al. |
| 7,234,876 B2 | 6/2007 | Ohtsu et al. |
| 7,234,877 B2 | 6/2007 | Sedor |
| 7,239,812 B2 | 7/2007 | Hung et al. |
| 7,244,066 B2 | 7/2007 | Theuerkorn |
| 7,255,486 B2 | 8/2007 | Cox et al. |
| 7,255,490 B2 | 8/2007 | Zhang et al. |
| 7,264,401 B2 | 9/2007 | Johnson |
| 7,264,402 B2 | 9/2007 | Theuerkorn et al. |
| 7,278,791 B2 | 10/2007 | Demaret et al. |
| 7,281,856 B2 | 10/2007 | Grzegorzewska et al. |
| 7,290,941 B2 | 11/2007 | Kiani et al. |
| 7,292,763 B2 | 11/2007 | Smith et al. |
| 7,317,863 B2 | 1/2008 | Lu et al. |
| 7,326,087 B2 | 2/2008 | Gerlach et al. |
| 7,331,719 B2 | 2/2008 | Manning et al. |
| RE40,150 E | 3/2008 | Ishibashi et al. |
| 7,346,256 B2 | 3/2008 | Marrs et al. |
| 7,347,627 B2 | 3/2008 | Saito et al. |
| 7,369,738 B2 | 5/2008 | Larson et al. |
| 7,371,014 B2 | 5/2008 | Willis et al. |
| 7,380,992 B2 | 6/2008 | Kramer et al. |
| 7,460,750 B2 | 12/2008 | Durrant et al. |
| 7,463,803 B2 | 12/2008 | Cody et al. |
| 7,467,896 B2 | 12/2008 | Melton et al. |
| 7,481,585 B2 | 1/2009 | Scadden et al. |
| 7,534,050 B2 | 5/2009 | Kachmar |
| 7,572,065 B2 | 8/2009 | Lu et al. |
| 7,591,595 B2 | 9/2009 | Lu et al. |
| 7,614,797 B2 | 11/2009 | Lu et al. |
| 7,677,814 B2 | 3/2010 | Lu et al. |
| 7,686,519 B2 | 3/2010 | Lu |
| 7,722,258 B2 | 5/2010 | Lu et al. |
| 7,744,286 B2 | 6/2010 | Lu et al. |
| 7,744,288 B2 | 6/2010 | Lu et al. |
| 7,762,726 B2 | 7/2010 | Lu et al. |
| 7,942,590 B2 | 5/2011 | Lu et al. |
| 7,959,361 B2 | 6/2011 | Lu et al. |
| RE42,522 E | 7/2011 | Zimmel et al. |
| 8,135,256 B2 | 3/2012 | Solheid et al. |
| 8,202,008 B2 | 6/2012 | Lu et al. |
| 8,272,792 B2 | 9/2012 | Coleman |
| 8,285,096 B2 | 10/2012 | Coleman |
| 8,303,193 B2 | 11/2012 | Coleman |
| 8,414,196 B2 | 4/2013 | Lu et al. |
| 8,770,862 B2 | 7/2014 | Lu et al. |
| 8,939,654 B2 | 1/2015 | Lu et al. |
| 9,389,372 B2 | 7/2016 | Kachmar |
| 10,859,771 B2 | 12/2020 | Nhep |
| 2001/0012428 A1 | 8/2001 | Nakajima et al. |
| 2001/0036345 A1 | 11/2001 | Gimblet et al. |
| 2002/0022392 A1 | 2/2002 | Below et al. |
| 2002/0062978 A1 | 5/2002 | Sakabe et al. |
| 2002/0081077 A1 | 6/2002 | Nault |
| 2002/0164130 A1 | 11/2002 | Elkins, II et al. |
| 2003/0063867 A1 | 4/2003 | McDonald et al. |
| 2003/0081905 A1 | 5/2003 | Bethea et al. |
| 2003/0094298 A1 | 5/2003 | Morrow et al. |

(56) References Cited

U.S. PATENT DOCUMENTS

| | | |
|---|---|---|
| 2003/0095754 A1 | 5/2003 | Matsumoto et al. |
| 2003/0095780 A1 | 5/2003 | Chang |
| 2004/0017983 A1 | 1/2004 | Chen et al. |
| 2004/0033028 A1 | 2/2004 | Cheng |
| 2004/0038588 A1 | 2/2004 | Bernardi et al. |
| 2004/0047566 A1 | 3/2004 | McDonald et al. |
| 2004/0120663 A1 | 6/2004 | Lail et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2005/0041928 A1 | 2/2005 | Zimmel et al. |
| 2005/0064752 A1 | 3/2005 | Serino |
| 2005/0100286 A1 | 5/2005 | Cox |
| 2005/0117850 A1 | 6/2005 | Milette |
| 2005/0215101 A1 | 9/2005 | Pepe |
| 2005/0232553 A1 | 10/2005 | Holmquist |
| 2005/0254757 A1 | 11/2005 | Ferretti, III et al. |
| 2006/0056769 A1 | 3/2006 | Khemakhem et al. |
| 2006/0088247 A1 | 4/2006 | Tran et al. |
| 2006/0088248 A1 | 4/2006 | Tran et al. |
| 2006/0089049 A1 | 4/2006 | Sedor |
| 2006/0115219 A1 | 6/2006 | Mudd et al. |
| 2006/0193562 A1 | 8/2006 | Theuerkorn |
| 2007/0025665 A1 | 2/2007 | Dean, Jr. et al. |
| 2007/0077010 A1 | 4/2007 | Melton et al. |
| 2007/0127873 A1 | 6/2007 | Manning et al. |
| 2008/0044137 A1 | 2/2008 | Luther et al. |
| 2008/0131132 A1 | 6/2008 | Solheid et al. |
| 2008/0175541 A1 | 7/2008 | Lu et al. |
| 2008/0175542 A1 | 7/2008 | Lu et al. |
| 2008/0175546 A1 | 7/2008 | Lu et al. |
| 2008/0273840 A1 | 11/2008 | Lu et al. |
| 2008/0310796 A1 | 12/2008 | Lu |
| 2009/0003772 A1 | 1/2009 | Lu et al. |
| 2009/0041411 A1 | 2/2009 | Melton et al. |
| 2009/0060423 A1 | 3/2009 | Melton et al. |
| 2009/0148101 A1 | 6/2009 | Lu et al. |
| 2009/0148102 A1 | 6/2009 | Lu et al. |
| 2009/0148103 A1 | 6/2009 | Lu et al. |
| 2009/0148104 A1* | 6/2009 | Lu ............... G02B 6/3877 385/72 |
| 2009/0162016 A1 | 6/2009 | Lu et al. |
| 2010/0034502 A1 | 2/2010 | Lu et al. |
| 2010/0209052 A1 | 8/2010 | Lu et al. |
| 2010/0266242 A1 | 10/2010 | Lu et al. |
| 2010/0266244 A1 | 10/2010 | Lu et al. |
| 2010/0290741 A1 | 11/2010 | Lu et al. |
| 2011/0013871 A1 | 1/2011 | Lu et al. |
| 2014/0133804 A1 | 5/2014 | Lu et al. |
| 2014/0314379 A1 | 10/2014 | Lu et al. |
| 2014/0321813 A1 | 10/2014 | Lu et al. |
| 2015/0241639 A1 | 8/2015 | Lu et al. |
| 2016/0018604 A1 | 1/2016 | Gurreri et al. |

FOREIGN PATENT DOCUMENTS

| | | |
|---|---|---|
| EP | 0 156 075 A2 | 10/1985 |
| EP | 0 345 519 A2 | 12/1989 |
| EP | 0 547 778 A1 | 6/1993 |
| EP | 0 581 527 A1 | 2/1994 |
| EP | 0 689 069 A1 | 12/1995 |
| EP | 0 468 671 B1 | 1/1996 |
| EP | 0 762 171 A1 | 3/1997 |
| EP | 0 848 267 A2 | 6/1998 |
| EP | 0 855 610 A2 | 7/1998 |
| EP | 0 856 761 A1 | 8/1998 |
| EP | 0 940 700 A2 | 9/1999 |
| EP | 0 949 522 A2 | 10/1999 |
| EP | 0 997 757 A2 | 5/2000 |
| EP | 1 065 542 A1 | 1/2001 |
| EP | 1 091 227 | 4/2001 |
| EP | 1 258 758 A2 | 11/2002 |
| EP | 1 333 537 A1 | 8/2003 |
| EP | 1 457 793 A2 | 9/2004 |
| EP | 1 566 674 A1 | 8/2005 |
| GB | 2 154 333 A | 9/1985 |
| JP | 52-30447 | 3/1977 |
| JP | 58-142308 | 8/1983 |
| JP | 62-54204 | 3/1987 |
| JP | 4-44607 | 4/1992 |
| JP | 5-106765 | 4/1993 |
| JP | 8-62432 | 3/1996 |
| JP | 9-135526 | 5/1997 |
| JP | 9-159867 | 6/1997 |
| JP | 10-160969 | 6/1998 |
| JP | 11-160579 | 6/1999 |
| JP | 2000-292653 | 10/2000 |
| JP | 2001-116968 | 4/2001 |
| JP | 2003-195103 | 7/2003 |
| JP | 2005-114860 | 4/2005 |
| JP | 2006-146084 | 6/2006 |
| WO | WO 94/15232 | 7/1994 |
| WO | WO 94/25885 | 11/1994 |
| WO | WO 96/37792 | 11/1996 |
| WO | WO 00/31575 | 6/2000 |
| WO | WO 01/27660 A2 | 4/2001 |
| WO | WO 01/92937 A1 | 12/2001 |
| WO | WO 03/073819 A2 | 9/2003 |
| WO | WO 2005/072395 A2 | 8/2005 |
| WO | WO 2005/101078 A1 | 10/2005 |
| WO | 2012/112344 A9 | 8/2012 |
| WO | WO 2013/177016 | 11/2013 |

OTHER PUBLICATIONS

U.S. Appl. No. 60/607,696, filed Sep. 7, 2004 entitled "Optical Transceiver Module With Environmentally Sealed, Hardened, Strain Relieved and Shielded Adapter for Outside Plant Cable Assemblies".

Delphi Connection Systems, "Harsh Environment Hermaphroditic Fiber Optic Connectors," 16 pages (© 2002).

Invitation to Pay Additional Fees With Partial International Search cited in PCT/US2008/086085 dated Apr. 6, 2009.

International Search Report and Written Opinion cited in PCT/US2005/086085 dated Jul. 3, 2009.

Mikon Series ST-III Multimode and Singlemode Connectors, 2 pages (Publicly known at least as early as Jan. 2, 1992).

Opti Tap™ Connector. An Evolant Solutions Product, 2 pages (Sep. 2005).

Stratos Lightwave™ Brochure, "HDLC Hermaphroditic Butt Joint Connector," 2 pages (known as prior art at least as early as Sep. 8, 2003.

Stratos Lightwave™ Brochure, "HQLC Hermaphroditic Butt Joint Connector," 2 pages (known as prior art at least as early as Sep. 8, 2003).

* cited by examiner

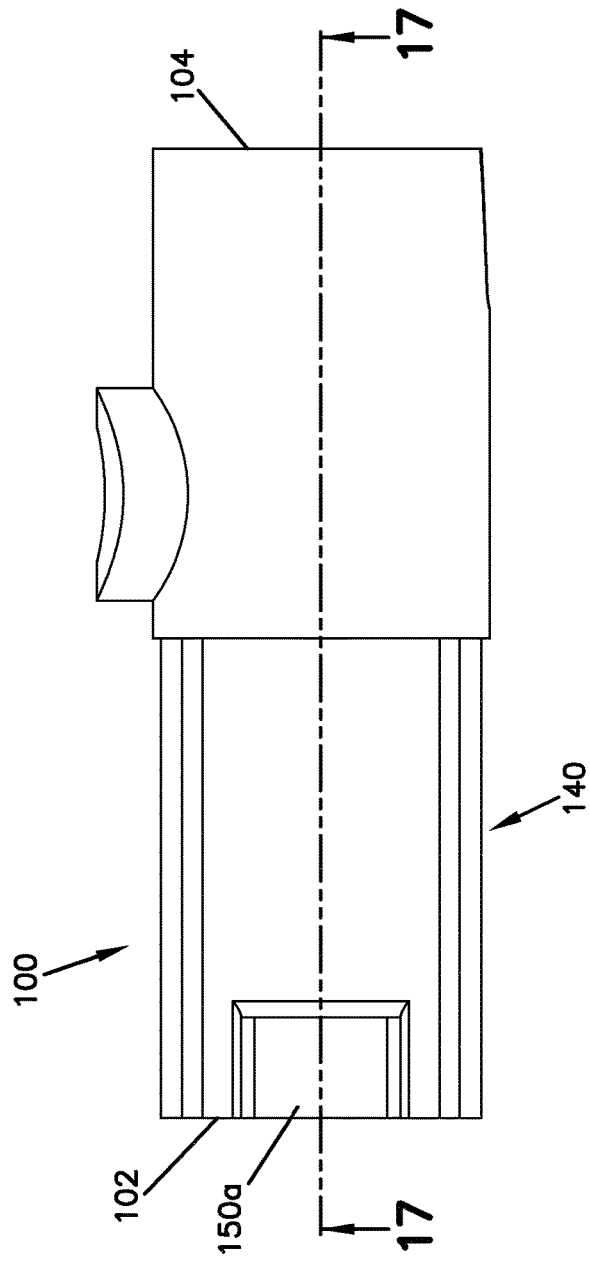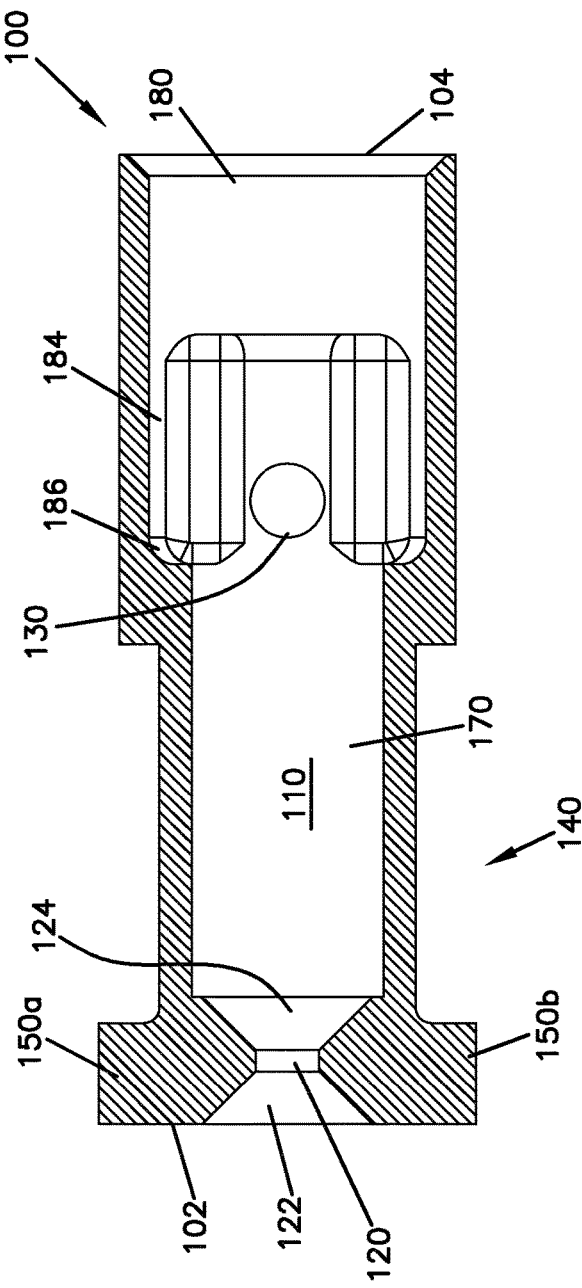
FIG. 16
FIG. 17

FIBER OPTIC CABLE ANCHORING DEVICE FOR USE WITH FIBER OPTIC CONNECTORS AND METHODS OF USING THE SAME

CROSS-REFERENCE TO RELATED APPLICATION(S)

This application is a Divisional of U.S. patent application Ser. No. 16/574,596 filed on 18 Sep. 2019, which is a Continuation of U.S. patent application Ser. No. 14/901,226 filed on 28 Dec. 2015, now U.S. Pat. No. 10,444,443, which is a National Stage of PCT/EP2014/063265 filed on 24 Jun. 2014, which claims benefit of U.S. Patent Application Ser. No. 61/840,353 filed on 27 Jun. 2013, the disclosures of which are incorporated herein by reference in their entireties. To to the extent appropriate, a claim of priority is made to each of the above disclosed applications.

TECHNICAL FIELD

The present disclosure relates to fiber optic data transmission, and more particularly to fiber optic cable connection systems.

BACKGROUND

Fiber optic cables are widely used to transmit light signals for high-speed data transmission. A fiber optic cable typically includes: 1) an optical fiber or optical fibers; 2) a buffer or buffers that surround the fiber or fibers; 3) a strength layer that surrounds the buffer or buffers; and 4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel, and epoxy reinforced glass roving. Outer jackets provide protection against damage caused by crushing, abrasions, and other physical damage. Outer jackets also provide protection against chemical damage (e.g., ozone, alkali, acids, etc.).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and a fiber optic adaptor for mechanically and optically coupling the fiber optic connectors together. Fiber optic connectors generally include ferrules that support the ends of the optical fibers of the fiber optic cables. The end faces of the ferrules are typically polished and are often angled. The fiber optic adaptor includes co-axially aligned ports (i.e., receptacles) for receiving the fiber optic connectors that are desired to be interconnected. One example of an existing fiber optic connection system is described at U.S. Pat. Nos. 6,579,014; 6,648,520; and 6,899,467.

Fiber optic connection systems have been developed that are hardened and/or ruggedized. Such hardened fiber optic connectors may provide additional strength and/or weather resistance compared to non-hardened fiber optic connection systems. Strength members within cables of such hardened fiber optic connection systems are typically structurally connected to a hardened fiber optic connector. The hardened fiber optic connector may be further structurally connected to a hardened fiber optic adaptor. The hardened fiber optic adaptor may be structurally connected to an enclosure or other fixedly mounted structure. Loads that are applied to the fiber optic cable are, for the most part, transmitted by the strength members to the fiber optic connector and, in turn, transferred to the fiber optic adaptor and, in turn, transferred to a mounting structure of the hardened fiber optic adaptor. Examples of such hardened fiber optic connection systems are illustrated and described at U.S. Pat. Nos. 7,744,286; 7,744,288; 7,762,726; and 7,942,590, which are all incorporated herein by reference in their entireties.

SUMMARY OF THE DISCLOSURE

The present disclosure relates to a fiber optic connector and cable assembly including a fiber optic cable, a connector housing, a ferrule, and an anchor. The fiber optic cable includes an optical fiber, a jacket that surrounds the optical fiber, and at least one strength member for providing the fiber optic cable with axial reinforcement. The connector housing includes a first end that is positioned opposite from a second end. The first end defines a plug portion that is adapted for insertion into a fiber optic adaptor, and the second end internally receives at least one strength member and the optical fiber of the fiber optic cable. The ferrule is positioned at the first end of the connector housing. The ferrule receives an end portion of the optical fiber. The ferrule defines an axis that extends through the connector housing from the first end to the second end of the connector housing. The anchor extends between a first end and a second end. The anchor is retained within the connector housing. The second end of the connector housing includes first and second housing components between which the anchor is captured. The anchor includes a passage that extends between the first end and the second end of the anchor. The at least one strength member is secured within the passage of the anchor by a bonding material such that the anchor anchors the at least one strength member to the connector housing.

Other aspects of the present disclosure relate to an anchor for anchoring a fiber optic cable within a fiber optic connector. The anchor includes a main body, a passage, and an injection port. The main body extends between a first end and an opposite second end. The passage extends between the first end and the second end of the anchor. The passage is adapted to pass through an optical fiber of the fiber optic cable. The passage includes a first portion and a second portion. The first portion of the passage is adapted to radially position the optical fiber of the fiber optic cable within the passage. The second portion of the passage is adapted to receive a bonding material and at least one strength member of the fiber optic cable. In certain embodiments, the passage further includes a third portion that is adapted to receive a jacket of the fiber optic cable. The injection port is adapted to deliver the bonding material to the passage of the anchor. In certain embodiments, the anchor further includes at least one retention tab that fits within a corresponding receiver provided within the fiber optic connector.

Still other aspects of the present disclosure relate to a method for anchoring a fiber optic cable within a fiber optic connector. The method includes: 1) providing an anchor that includes a passage; 2) inserting a strength member and an optical fiber of the fiber optic cable within the passage; 3) injecting bonding material within the passage thereby securing the strength member to the anchor; and 4) attaching the anchor within an interior of the fiber optic connector.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 16 is a bottom plan view of the anchor of FIG. 5;

FIG. 17 is a cross-sectional view of the anchor of claim 5, as called out at FIG. 16;

FIG. 26A is a perspective view of the fiber optic cable of FIG. 20;

FIG. 26B is a perspective view of the fiber optic cable of FIG. 20 with the anchor of FIG. 20 attached thereto;

FIG. 26C is a cutaway perspective view of the fiber optic cable of FIG. 20 with the anchor of FIG. 20 attached thereto;

FIG. 26D is a perspective view of the fiber optic cable of FIG. 20 with the anchor of FIG. 20 attached thereto and a ferrule attached to an optical fiber of the fiber optic cable;

FIG. 26E is a perspective view of the fiber optic cable of FIG. 20 with the anchor of FIG. 20 and the ferrule of FIG. 26D attached thereto and with a first housing component and a second housing component installed over the anchor; and FIG. 26F is a cutaway perspective view of the fiber optic cable of FIG. 20 with the anchor of FIG. 20 and the ferrule of FIG. 26D attached thereto and with the first and second housing components of FIG. 26E installed over the anchor.

DETAILED DESCRIPTION

Figure 1:
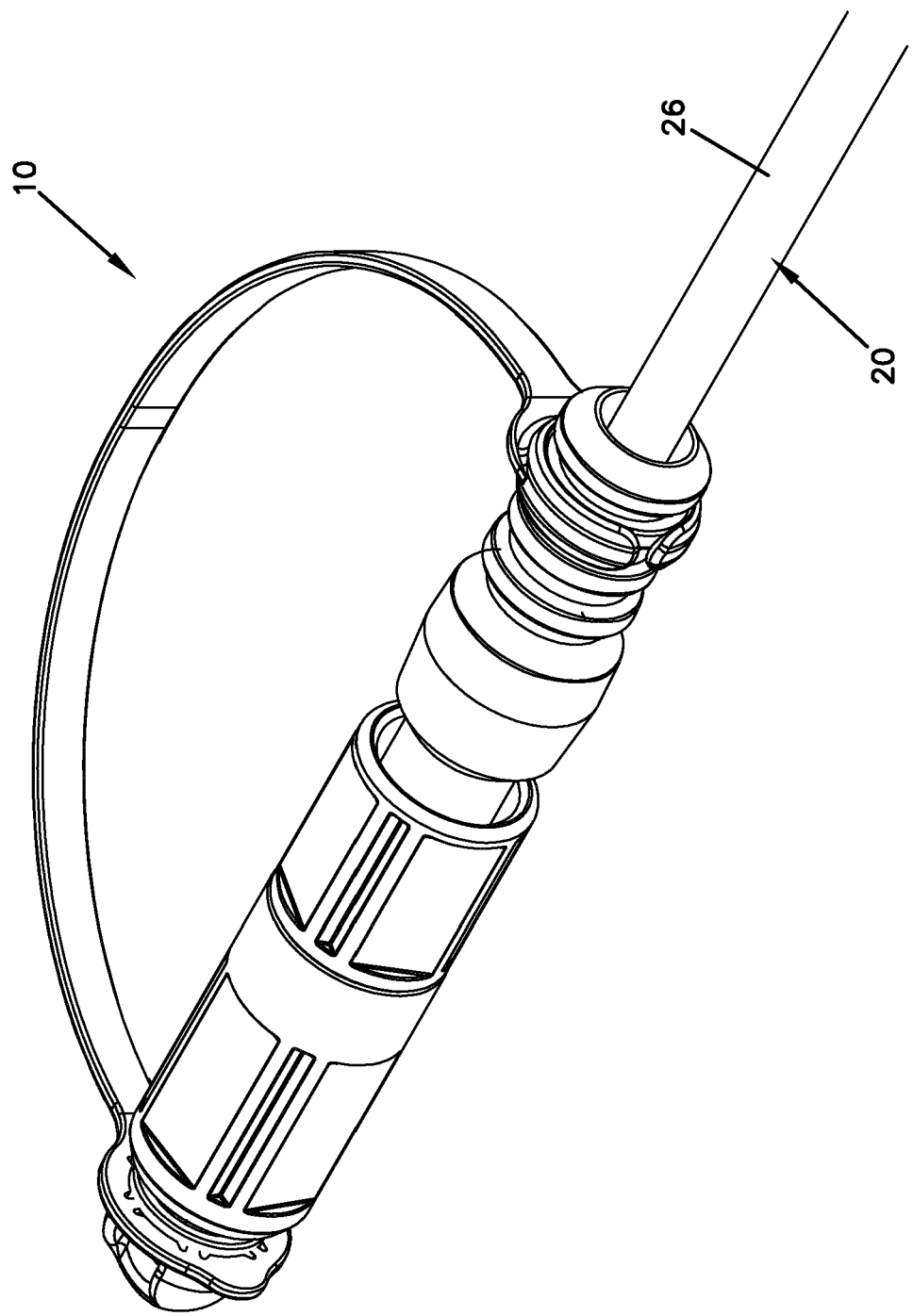
FIG. 1 is a perspective view of an example fiber optic connection system according to the principles of the present disclosure.

According to the principles of the present disclosure, a fiber optic cable can be securely attached to a fiber optic connector. In certain embodiments, crimp bands, crimp rings, etc. are not used. Instead, strength members of a fiber optic cable are internally bonded within an anchor that anchors the strength members to a fiber optic connector. In certain embodiments, a passage extends through the anchor, and the strength members are inserted within the passage and bonded within the passage to the anchor. An optical fiber of the fiber optic cable may also extend through the passage of the anchor. In certain embodiments, the strength members terminate within the passage of the anchor. The fiber optic cable may thereby be terminated by the fiber optic connector. In certain embodiments, the fiber optic connector may be a hardened fiber optic connector.

Turning now to FIGS. 1-4, an example fiber optic connector and cable assembly 10 is illustrated. The fiber optic connector and cable assembly 10 includes a fiber optic cable 20, a connector housing 50, and an anchor 100. In the illustrated embodiment, the fiber optic cable 20 is a cylindrical fiber optic cable. The fiber optic cable 20 includes a jacket 26, surrounding a layer of strength members 40 and an optical fiber 30 that is surrounded by the strength members 40 and the jacket 26. The connector housing 50 extends between a first end 52 and a second end 54. A plug portion 56 is positioned adjacent the first end 52. In the depicted embodiment, the connector housing 50 includes a first housing component 60 and a second housing component 70. In the depicted embodiment, the first housing component 60 is a one-piece main body that includes the plug portion 56 and a proximal extension 64 that extends proximally from the plug portion 56. In the depicted embodiment, the second housing component 70 is a cover that covers the proximal extension 64 and thereby forms a passage 58 between the second housing component 70 and the proximal extension 64. The passage 58 continues from the first end 52 to the second end 54 of the connector housing 50. A ferrule 80 may be positioned at the first end 52 of the connector housing at least partially within the passage 58. An end portion 22 of the fiber optic cable may be inserted through the second end 54 of the connector housing 50 and through the passage 58. The end portion 22 of the fiber optic cable 20 may be prepared prior to the insertion into the passage 58 of the connector housing 50. For example, an end portion of the jacket 26 may be stripped away thereby exposing an end portion 32 of the optical fiber 30. In addition, the strength members 40 may be trimmed back. In the depicted embodiment, the strength members 40 extend beyond the trimmed end of the jacket 26 after trimming. The anchor 100 may be pre-applied to the fiber optic cable 20 prior to the insertion of the end portion 22 into the passage 58. Additional details of the anchor 100 and its attachment to the fiber optic cable 20 are provided hereafter.

Figure 4:
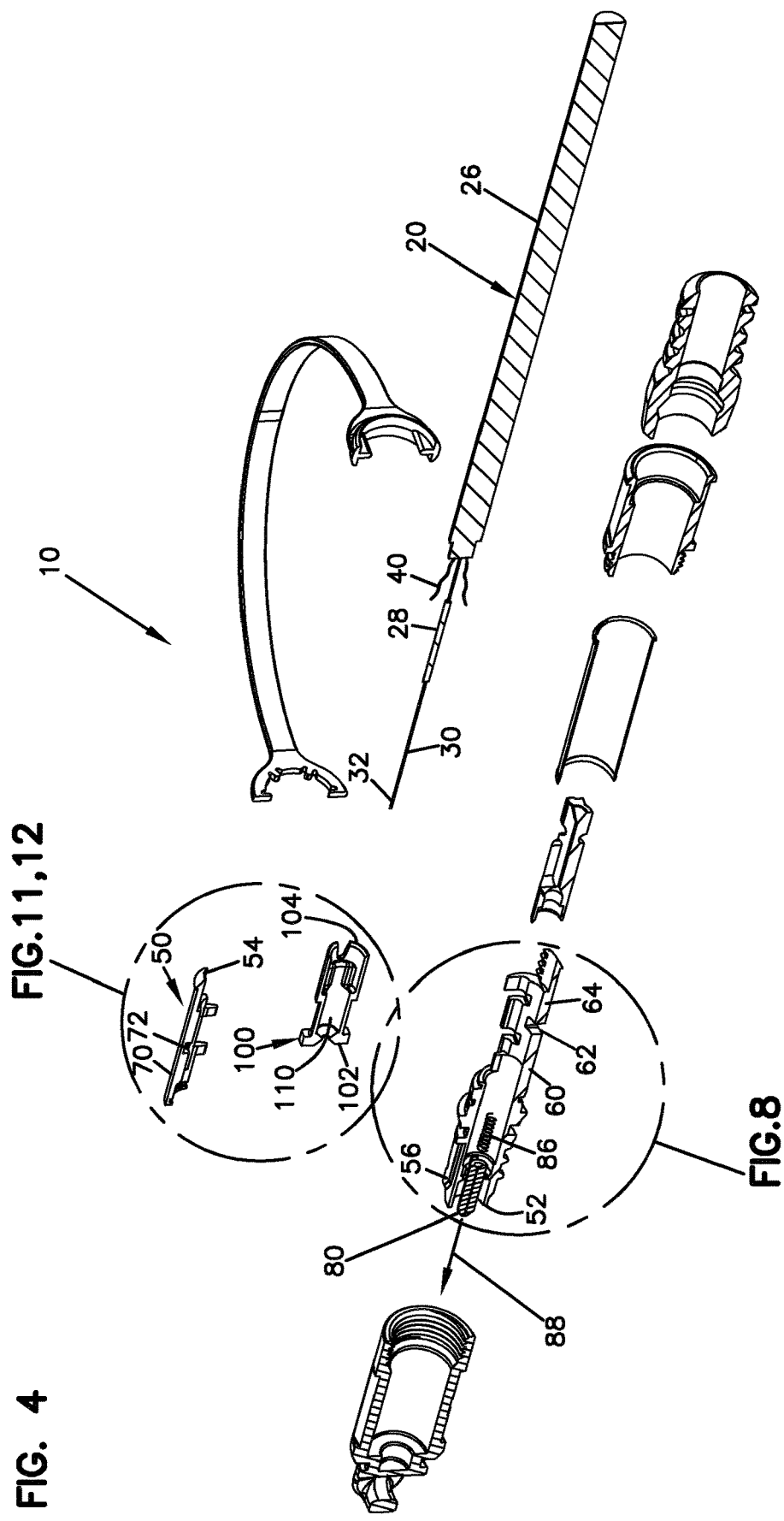
FIG. 4 is the exploded perspective view of FIG. 3, but with a cutaway taken through the vertical center plane.

As illustrated at FIG. 4, a spring 86 may be included within the passage 58. The spring 86 may urge the ferrule 80 in a direction 88 that extends from the second end 54 toward the first end 52 of the connector housing 50 along an axis A1 (see also FIG. 2). The spring 86 may be retained by a spring holder 82 (see FIG. 3).

Figure 5:
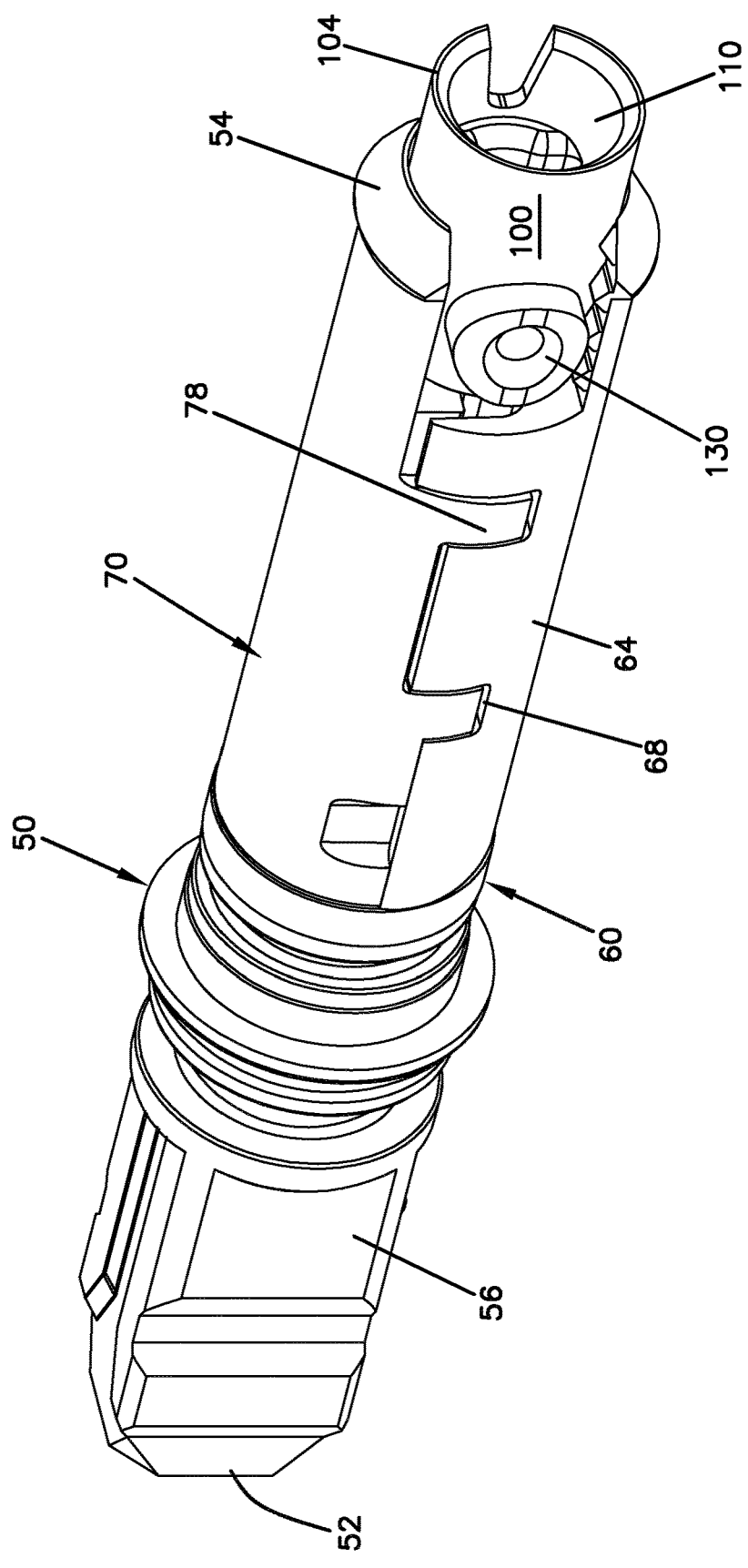
FIG. 5 is a perspective view of a connector housing and an anchor of the fiber optic connection system of FIG. 1 according to the principles of the present disclosure.
Figure 6:
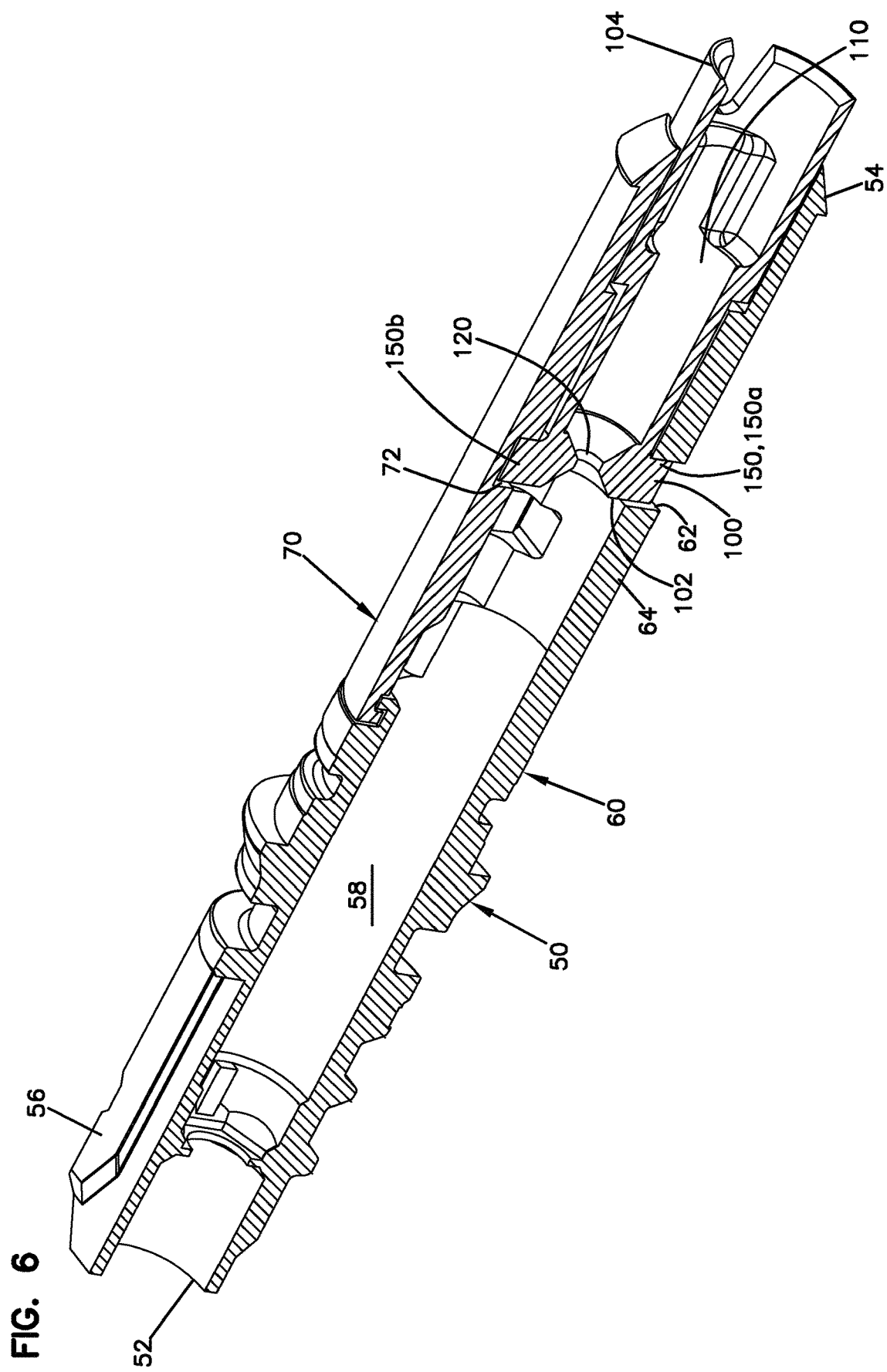
FIG. 6 is the perspective view of FIG. 5, but with a cutaway taken through the vertical center plane.
Figure 7:
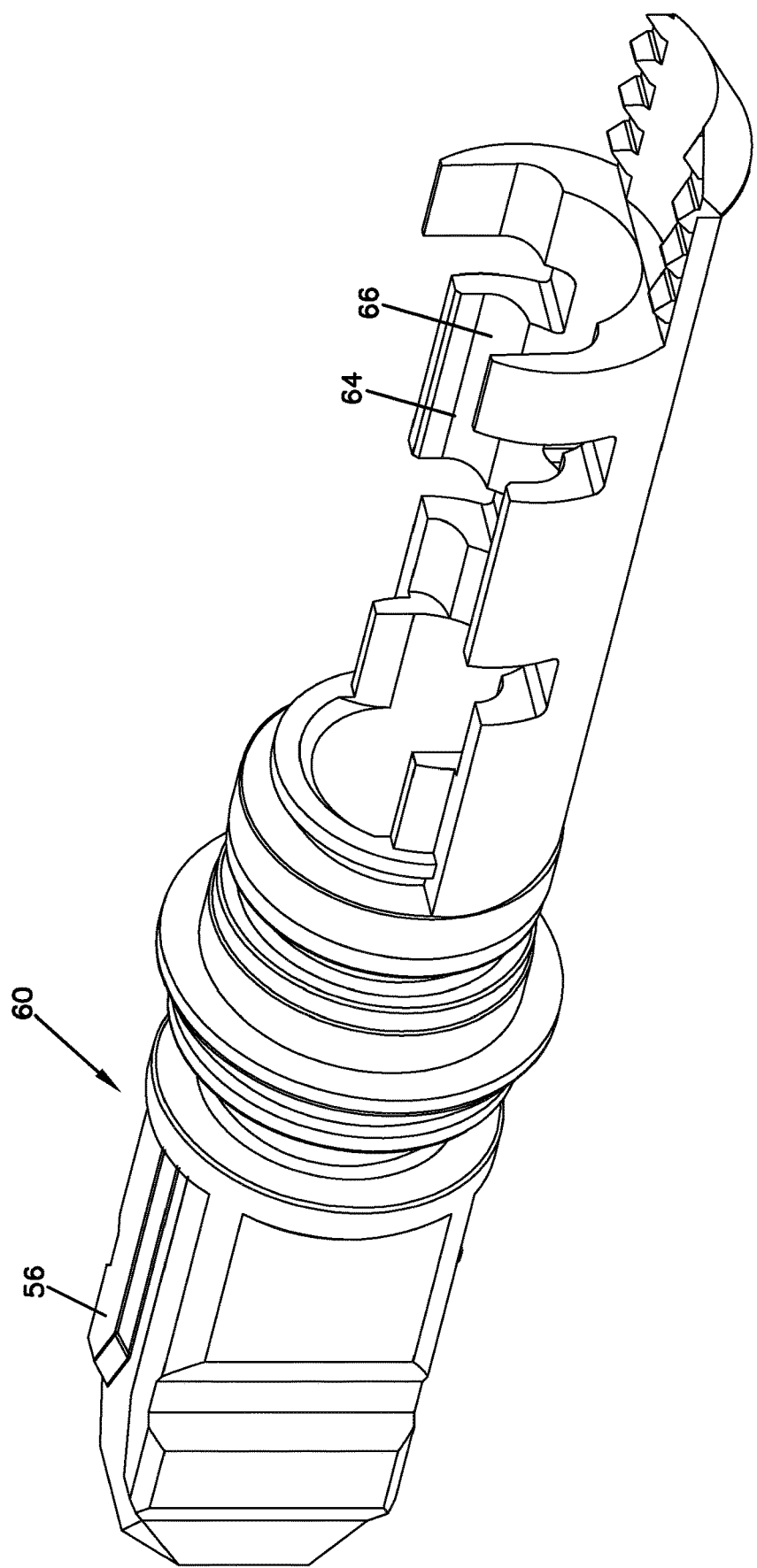
FIG. 7 is a perspective view of a first housing component of the connector housing of FIG. 5.
Figure 8:
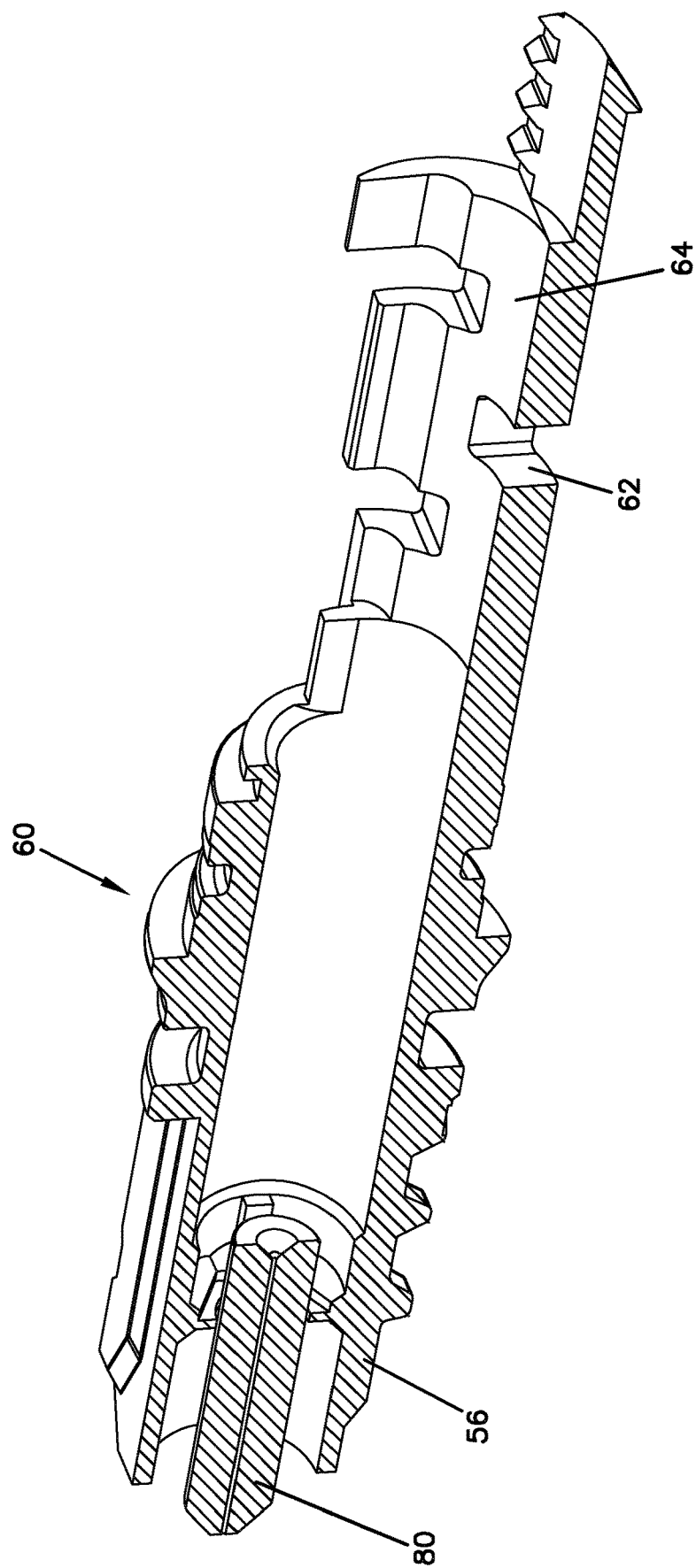
FIG. 8 is the perspective view of FIG. 7, but with a cutaway taken through the vertical center plane.
Figure 9:
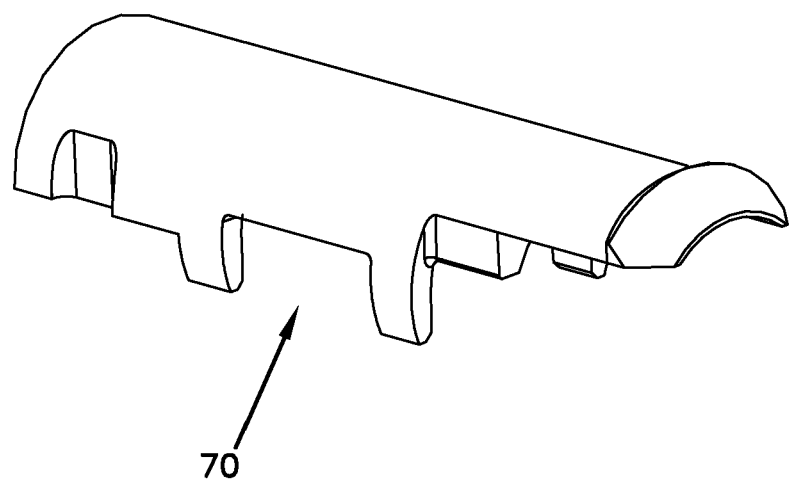
FIG. 9 is a perspective view of a second housing component of the connector housing of FIG. 5.

Turning now to FIGS. 5-12, the connection between the anchor 100 and the connector housing 50 will be described in detail. The anchor 100 includes an attachment portion 140. In the depicted embodiment, the attachment portion 140 includes a pair of retention tabs 150. In particular, the pair of retention tabs 150 includes a first retention tab 150a and a second retention tab 150b. As illustrated at FIG. 6, the first retention tab 150a is received within a receiver 62 of the first housing component 60. Similarly, the second retention tab 150b is received within a receiver 72 of the second housing component 70. As can be seen at FIG. 4, engaging the first retention tab 150a into the receiver 62 can be accomplished by vertically dropping the anchor 100 into the uncovered proximal extension 64 of the first housing component 60. If the fiber optic cable 20 is pre-installed in the anchor 100, the end portion 32 may be threaded through the passage 58 that extends through the plug portion 56 prior to the final dropping of the anchor 100 into the open proximal extension 64. Upon the positioning of the anchor 100 into a portion of the passage 58 that extends through the proximal extension 64, the second housing component 70 is dropped over the anchor 100. In particular, the receiver 72 of the second housing component 70 is dropped over the second retention tab 150b. In addition to the retention tabs 150 and the receivers 62, 72, the anchor 100 may include a set of protrusions 160 (see FIG. 10). The protrusions 160 may seat within grooves 66 of the first housing component 60 (see FIG. 7).

In the depicted embodiment, the housing components 60, 70 include the female half of the connection and the anchor 100 includes the male half of the connection. In other embodiments, the receivers 62, 72 may be replaced with a male member, such as a tab. Likewise, the retention tabs 150 of the anchor 100 may be replaced with a female member, such as a receiver. In the depicted embodiment, the anchor 100 extends between a first end 102 and a second end 104. In the depicted embodiment, the retention tabs 150 are adjacent the first end 102 of the anchor 100. In the depicted embodiment, the second end 104 of the anchor extends proximally beyond the second end 54 of the connector housing 50.

In the depicted embodiment, the first housing component 60 and the second housing component 70 interlock with each other. For example, the first housing component 60 includes a plurality of notches 68 (see FIG. 5), and the second housing component 70 includes a plurality of tabs 78. The plurality of tabs 78 engage the plurality of notches 68 and thereby interconnect the second housing component 70 to the first housing component 60. Upon engagement of the first and second housing components 60, 70, a tube 84 may be positioned over the second housing component 70 and the proximal extension 64 of the first housing component 60 thereby securing the connector housing assembly 50.

Turning now to FIGS. 13-17, the anchor 100 will be described in detail. The anchor 100 includes a passage 110 that extends through the anchor 100 from the first end 102 to the second end 104. When assembled, the passage 110 is adapted to receive the optical fiber 30. In particular, the optical fiber 30 extends through the passage 110 and through the first end 102 and the second end 104 of the anchor 100. The passage 110 is further adapted to receive the strength members 40 within the passage 110. As depicted, the strength members 40 terminate within the passage 110. The passage 110 of the anchor 100 is further adapted to receive bonding material 90 (see FIG. 2). The bonding material 90 holds the strength members 40 to the anchor 100. In certain embodiments, the bonding material 90 may be an epoxy.

In certain embodiments, the bonding material 90 may adhere to the optical fiber 30 and thereby secure the optical fiber 30 within the passage 110 of the anchor 100. In other embodiments, a tube 28 (see FIG. 3) may be positioned over the optical fiber 30. In such embodiments, the tube 28 may prevent the bonding material 90 from adhering to the optical fiber 30.

The anchor 100 may include an injection port 130. The injection port 130 is adapted to inject the bonding material 90 into the passage 110 after the strength members 40, the optical fiber 30, and, optionally, the tube 28 have been installed in the passage 110. As depicted at FIG. 5, the injection port 130 may be accessible after the anchor 100 has been installed within the connector housing 50. As illustrated at FIG. 5, the injection port 130 may be positioned such that excess portions of the bonding material 90 at or around the outside of the injection port 130 do not interfere with the fitment of the first housing component 60 and the second housing component 70.

Turning now to FIG. 17, the passage 110 of the anchor 100 will be described in detail. The passage 110 includes a necked-down portion 120. In the depicted embodiment, the necked-down portion 120 is adjacent the first end 102 of the anchor 100. The necked-down portion 120 may be adapted to center and/or otherwise guide the optical fiber 30 within the passage 110 and/or guide the optical fiber 30 adjacent the first end 102 of the anchor 100. The necked-down portion 120 may also be adapted to guide the tube 28 and thereby center and/or position the tube 28 within the passage 110 and/or adjacent the first end 102 of the anchor 100. The necked-down portion 120 may further serve as a control to eliminate or reduce or restrict the bonding material 90 from flowing beyond the first end 102 of the anchor 100. As depicted, the necked-down portion 120 includes an outer taper 122 and an inner taper 124. The tapers 122 and/or 124 may act as guides for the optical fiber 30 and/or the tube 28 and thereby ease installation of the end portion 32 of the optical fiber 30 when inserting the end portion 32 through the passage 110 of the anchor 100. The taper 122 may collect the bonding material 90. For example, if a drip of the bonding material 90 leaks past a narrowest portion of the necked-down portion 120, to the taper 122 may collect the drip of the bonding material 90.

Figure 2:
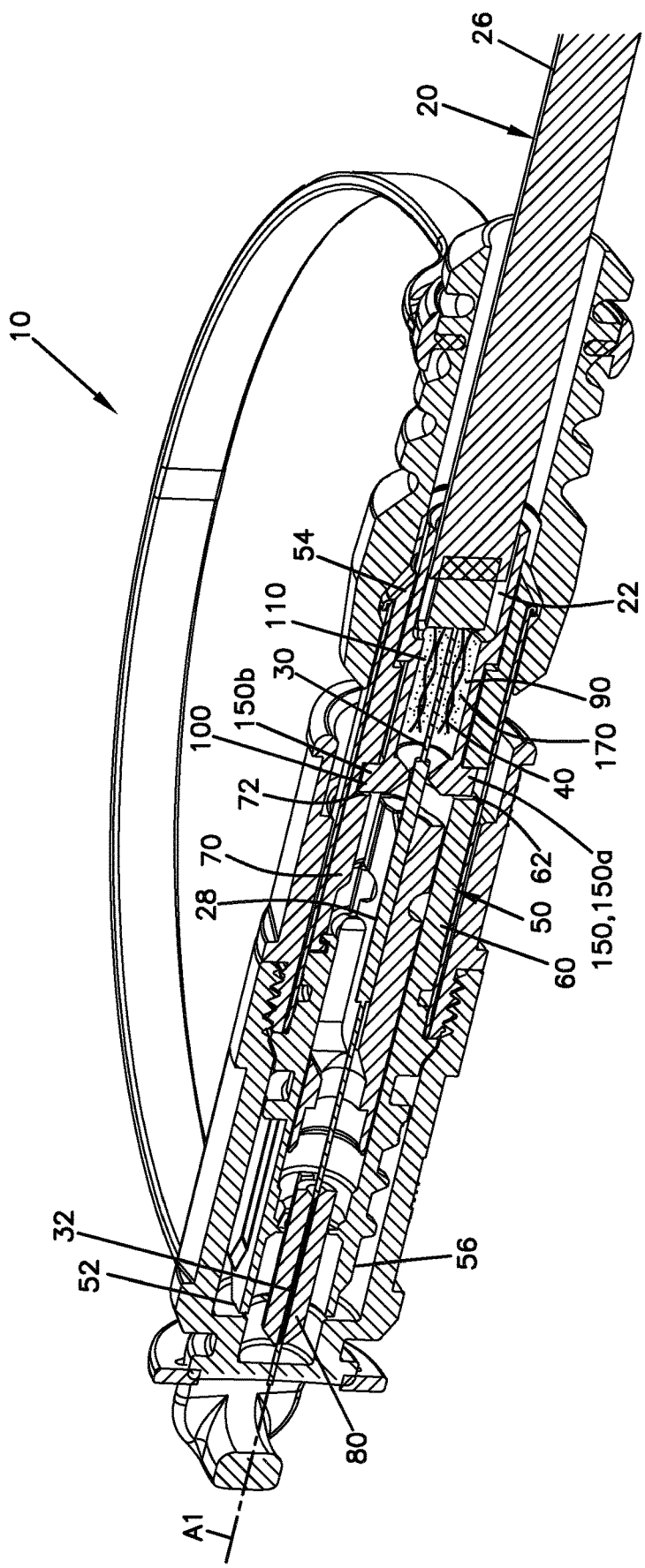
FIG. 2 is the perspective view of FIG. 1, but with a cutaway taken through a vertical center plane.
Figure 3:
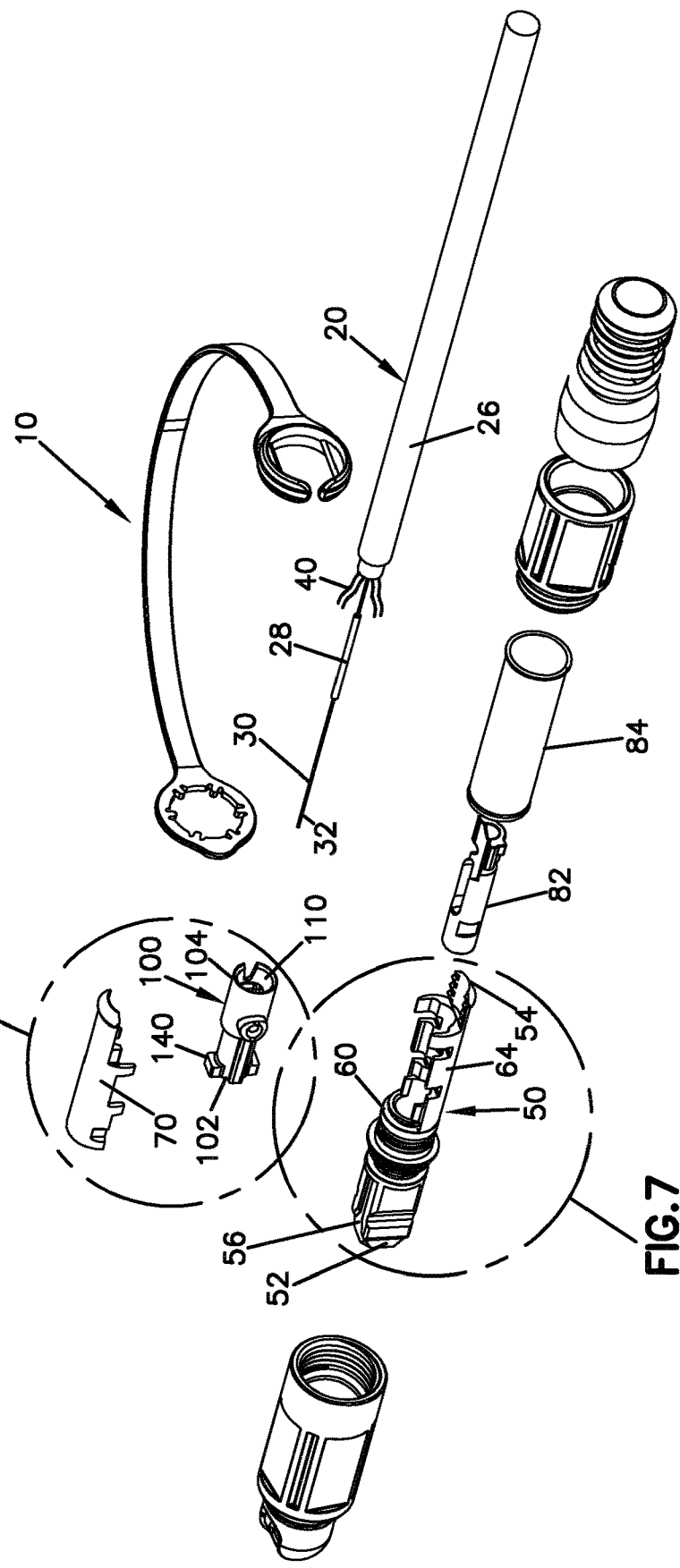
FIG. 3 is an exploded perspective view of the fiber optic connection system of FIG. 1.

The passage 110 may further include a main portion 170. As depicted at FIG. 2, the strength members 40 are encased by the bonding material 90 within the main portion 170 of the passage 110. In the depicted embodiment, the main portion 170 is relatively large in size. In other embodiments, the main portion 170 is reduced in size. In still other embodiments, the bonding material 90 adheres to the strength members 40 at a bonding portion that may be within the main portion 170.

The passage 110 of the anchor 100 further includes a cable jacket portion 180, in certain embodiments. The cable jacket portion 180 is adapted to receive the jacket 26 of the fiber optic cable 20. In particular, the jacket 26 may include an exterior shape that substantially matches an interior shape of the cable jacket portion 180.

Figure 10:
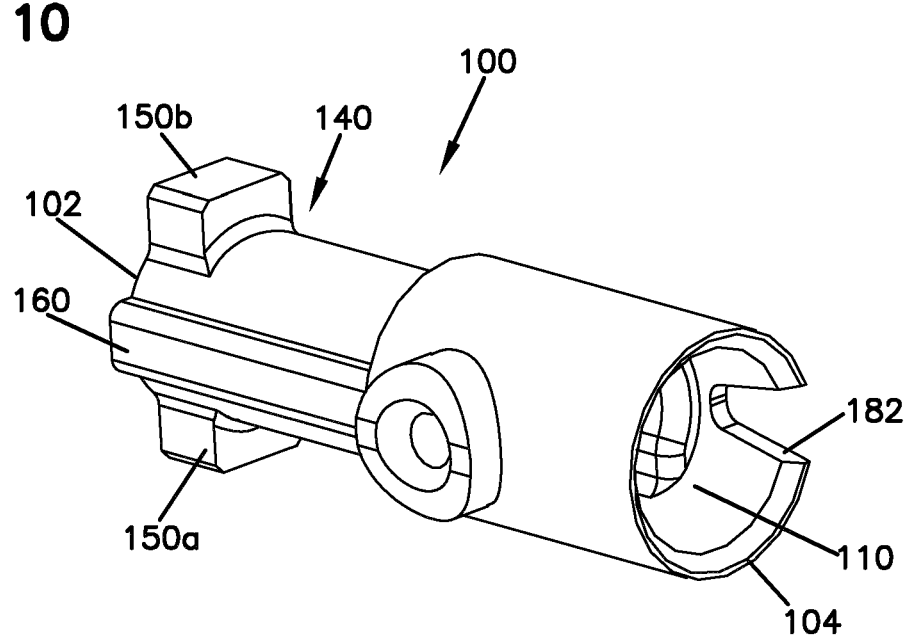
FIG. 10 is a perspective view of the anchor of FIG. 5.
Figure 11:
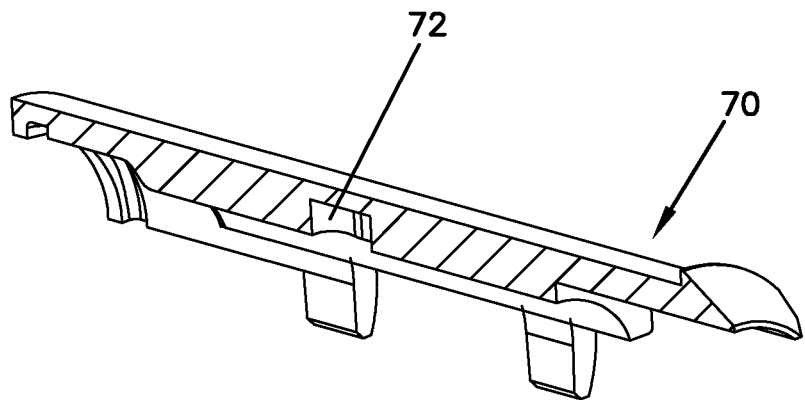
FIG. 11 is the perspective view of FIG. 9, but with a cutaway taken through the vertical center plane.
Figure 12:
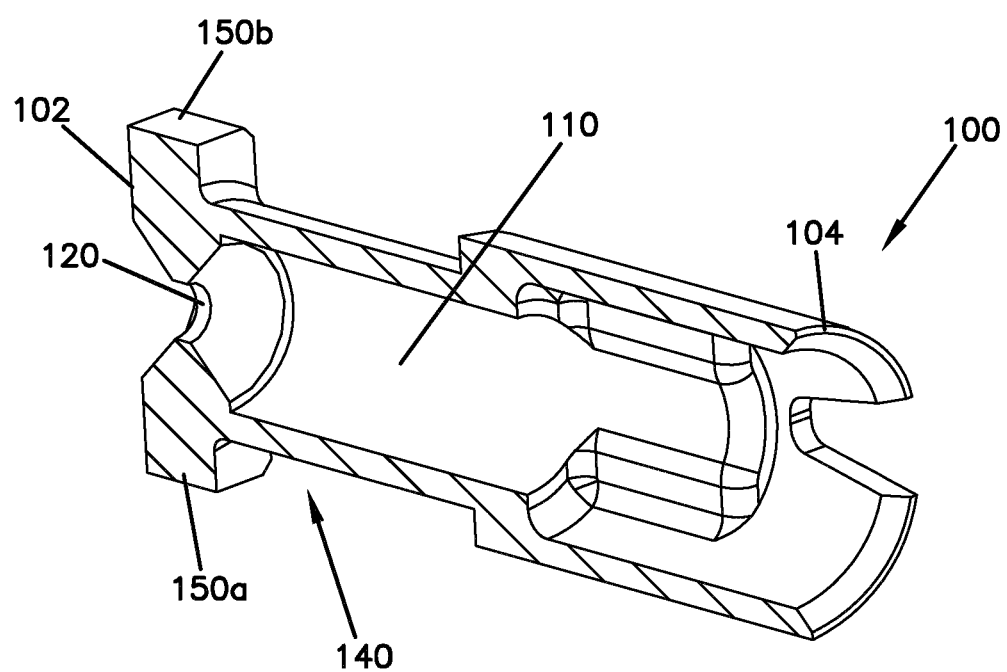
FIG. 12 is the perspective view of FIG. 10, but with a cutaway taken through the vertical center plane.
Figure 13:
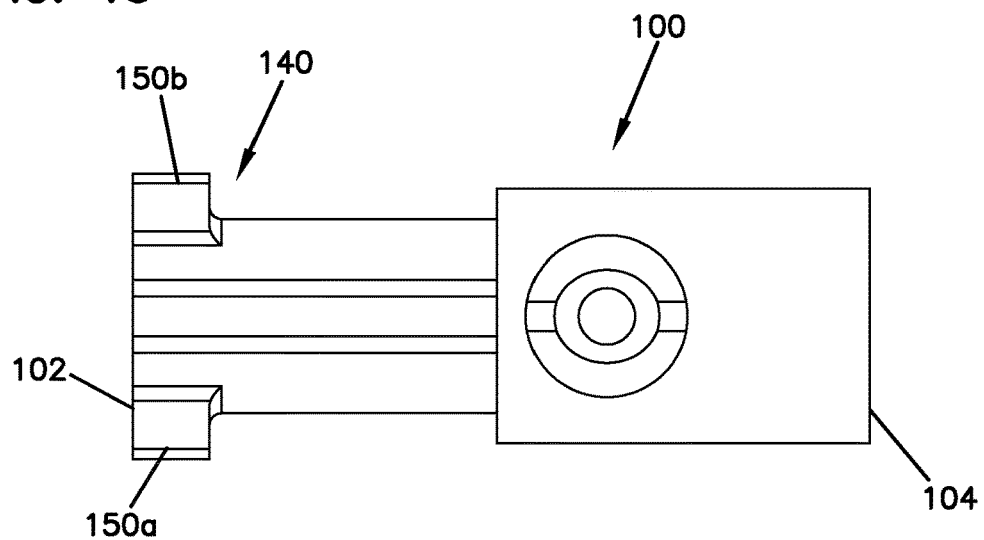
FIG. 13 is a side elevation view of the anchor of FIG. 5.
Figure 14:
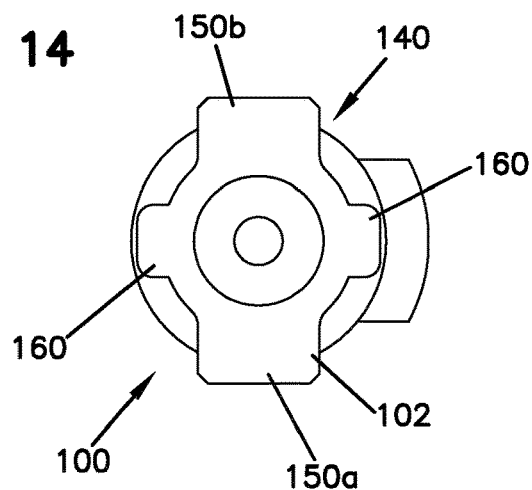
FIG. 14 is a distal end elevation view of the anchor of FIG. 5.
Figure 15:
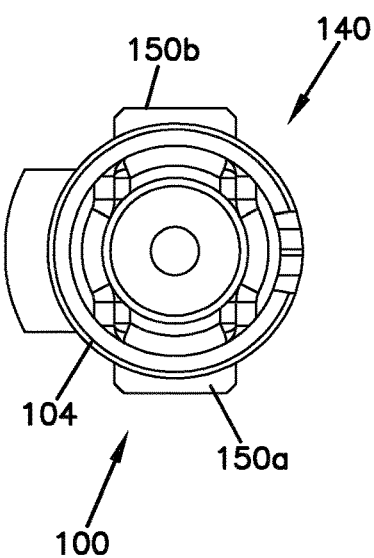
FIG. 15 is a proximal end elevation view of the anchor of FIG. 5.

In certain embodiments, the cable jacket portion 180 may include a notch 182 (see FIG. 10). In certain embodiments, the notch 182 may allow excess material from the jacket 26 of the fiber optic cable 20 to accumulate within the notch 182. The jacket 26, even if slightly oversized, may thereby be inserted within the cable jacket portion 180 of the passage 110. In certain embodiments, the notch 182 allows the cable jacket portion 180 to expand slightly in diameter and thereby accommodate the jacket 26 of the fiber optic cable 20, even if slightly oversized.

In certain embodiments, the notch 182 may be used as a tool to collect portions of the strength members 40 that are outside of the passage 110. In particular, if the jacket 26 and/or the fiber optic cable 20 is partially inserted or fully inserted into the passage 110, the portions of the strength members 40 that are outside of the passage 110 may be collected by the notch 182 by rotating the anchor 100 relative to the fiber optic cable 20 about the axis A1. As the portions of the strength members 40 that are outside of the passage 110 pass by the notch 182, the notch 182 traps the portions and funnels them into the passage 110. The relative rotating motion about the axis A1 may be combined with a relative translating motion between the anchor 100 and the fiber optic cable 20.

The cable jacket portion 180 may further include an annular portion 184 and/or portions of an annular portion 184 (see FIG. 17). The annular portion 184 may be used to receive both an outer surface of the jacket 26 and an interior surface of the jacket 26. The cable jacket portion 180 may further include a bottom 186. The distal end of the cable jacket 26 may bottom out upon insertion of the jacket 26 within the cable jacket portion 180 of the passage 110.

The fit of the cable jacket portion 180 over the cable jacket 26 may substantially prevent the bonding material 90 from leaking beyond the second end 104 of the anchor 100. The fit of the necked-down portion 120 and/or the cable jacket portion 180 with the fiber optic cable 20, the optical fiber 30, and/or the tube 28 may allow air to vent as the bonding material 90 is injected through the injection port 130. A suitable viscosity for the bonding material 90 may be selected to eliminate and/or minimize bonding material 90 from leaking beyond the necked-down portion 120 and/or the cable jacket portion 180.

Figure 18:
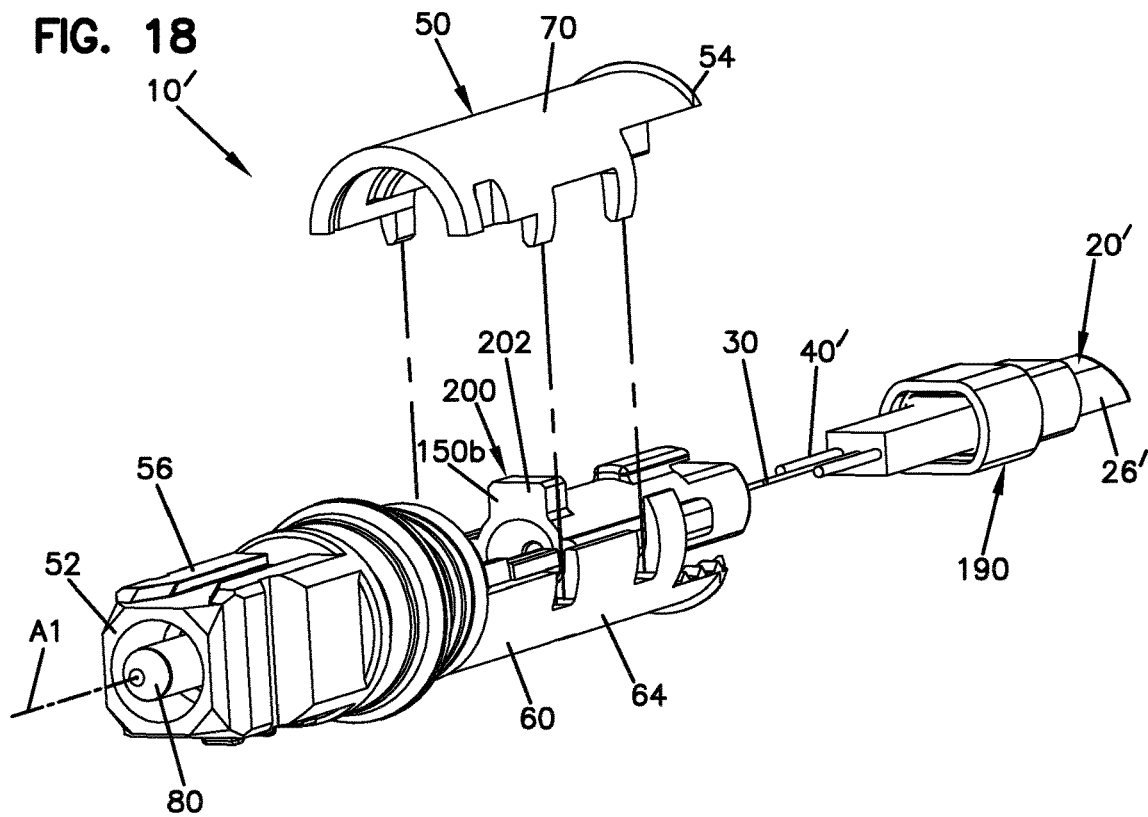
FIG. 18 is an exploded perspective view of another fiber optic connection system according to the principles of the present disclosure.
Figure 19:
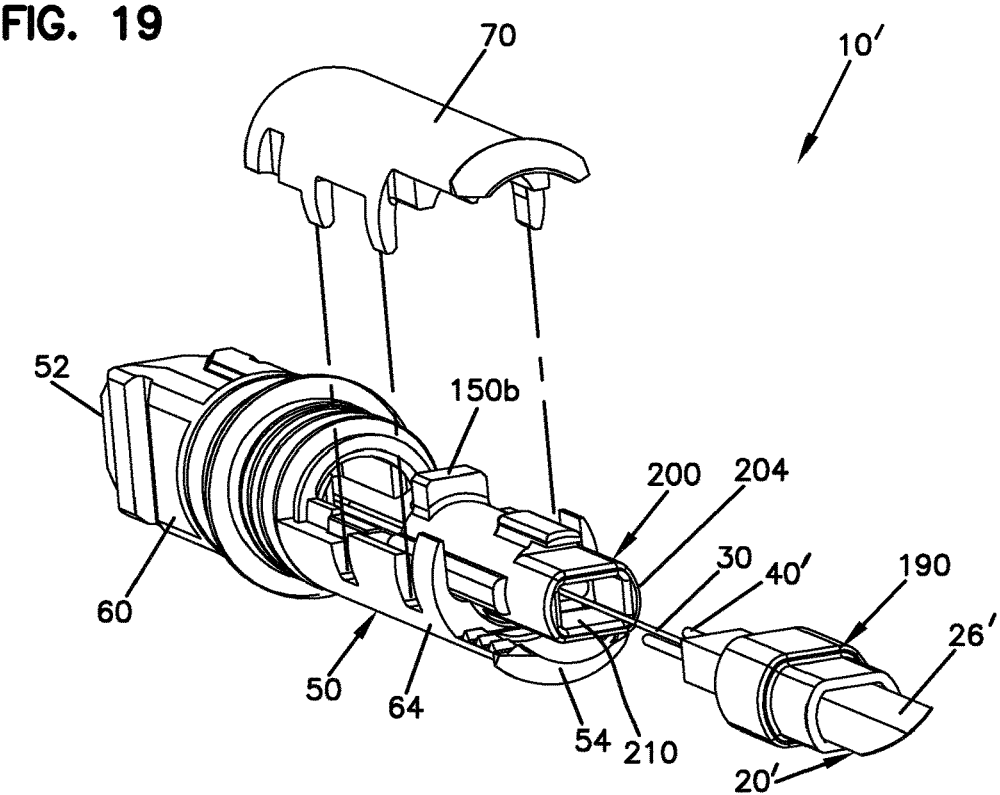
FIG. 19 is another exploded perspective view of the fiber optic connection system of FIG. 18.
Figure 20:
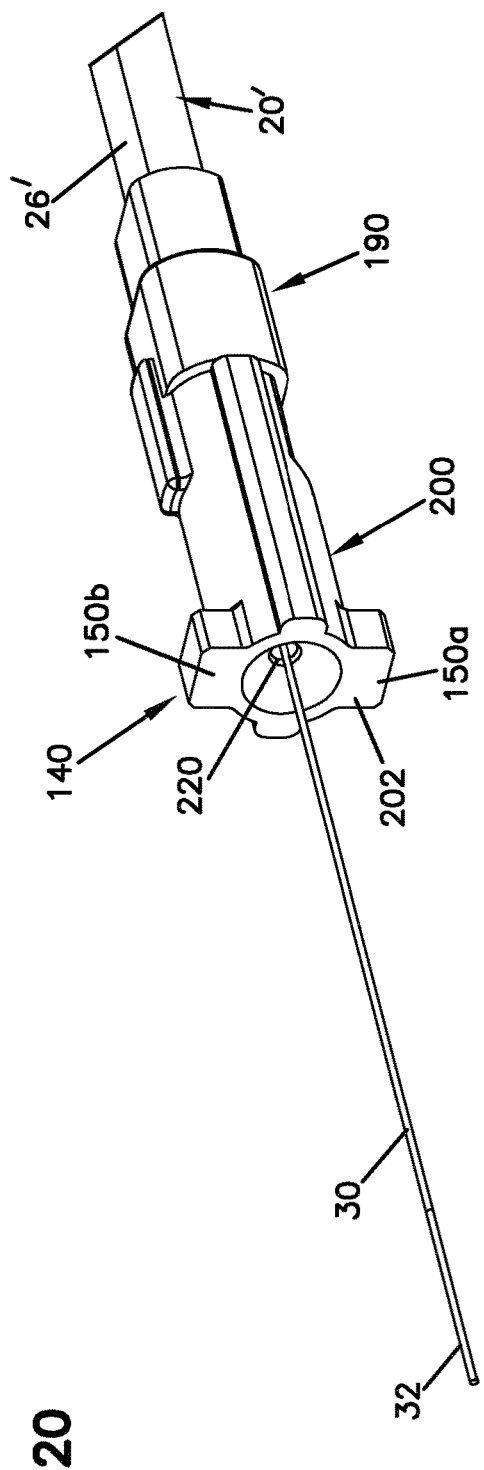
FIG. 20 is a perspective view of an anchor of the fiber optic connection system of FIG. 18 attached to a fiber optic cable.

Turning now to FIGS. 18 and 19, another fiber optic connector and cable assembly 10' is illustrated according to the principles of the present disclosure. The fiber optic connector and cable assembly 10' is similar to the fiber optic connector and cable assembly 10. Therefore, similar features of the fiber optic connector and cable assembly 10' will not typically be redundantly re-described.

Figure 24:
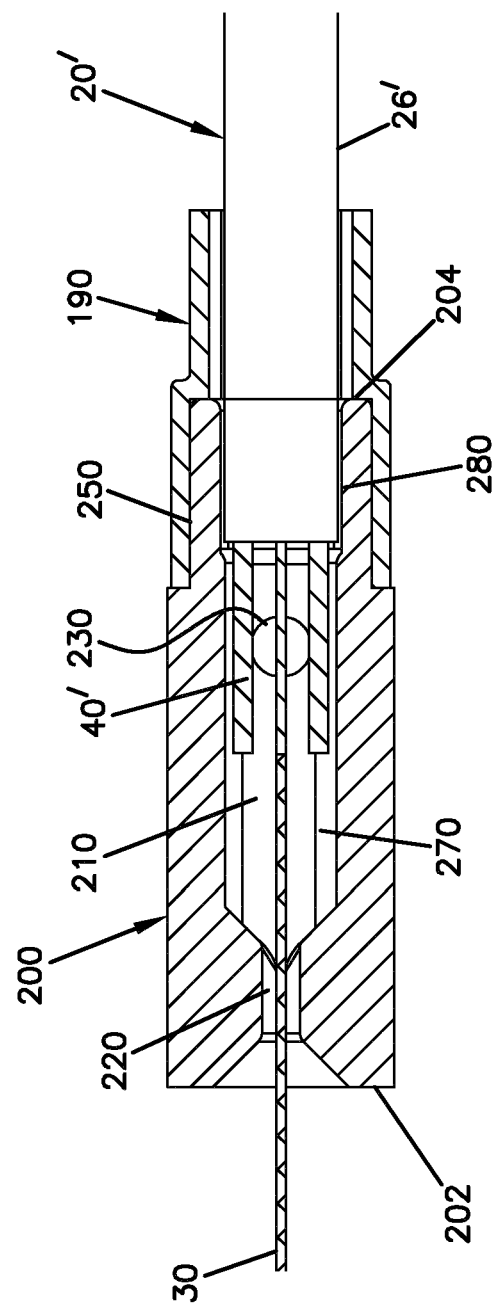
FIG. 24 is a cross-sectional top view of the anchor of cable 20 attached to the fiber optic cable, as called out at FIG. 22.

As depicted, the fiber optic connector and cable assembly 10' is adapted to terminate a noncircular fiber optic cable 20'. In particular, the fiber optic cable 20' includes a pair of strength members 40' positioned opposite an optical fiber 30. A jacket 26' of the fiber optic cable 20' may therefore be rectangular or obround in shape. As depicted, the pair of strength members 40' are opposite each other about a horizontal direction. The injection port 230 extends perpendicular to the horizontal plane and thereby allows the bonding material 90 to flow between the strength members 40' (see FIG. 24).

The anchor 200 extends between a first end 202 and a second end 204. The anchor 200 includes a passage 210 that extends through the anchor 200 and through the first end 202 and the second end 204. The passage 210 includes a necked-down portion 220, a main portion 270, and a cable jacket portion 280. The passage 210 may be shaped generally rectangularly or may be shaped obround to accommodate the pair of the strength members 40' and the jacket 26'.

Figure 21:
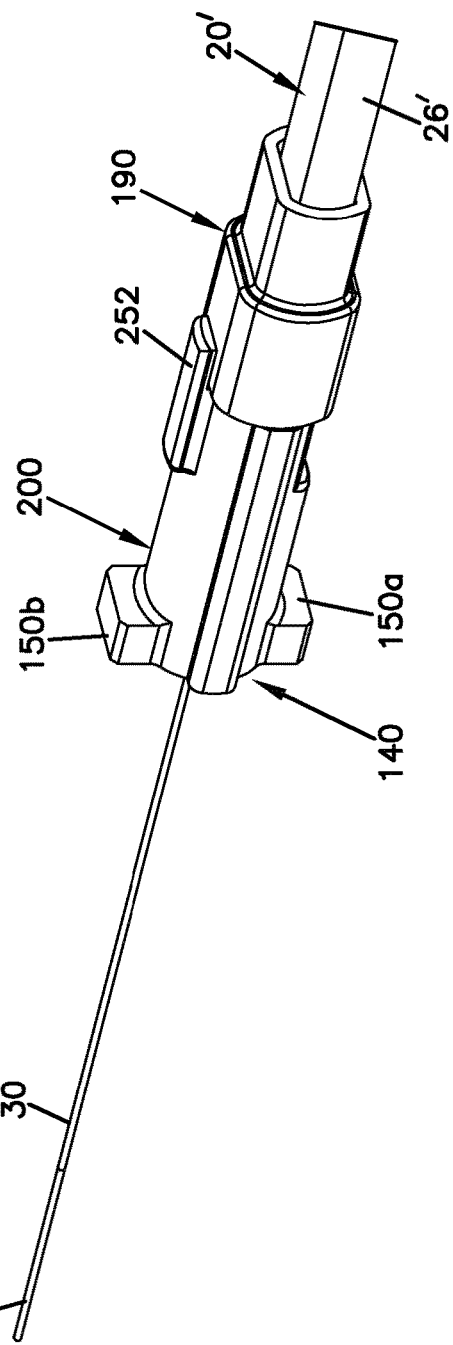
FIG. 21 is another perspective view of the anchor of FIG. 20 attached to the fiber optic cable.
Figure 22:
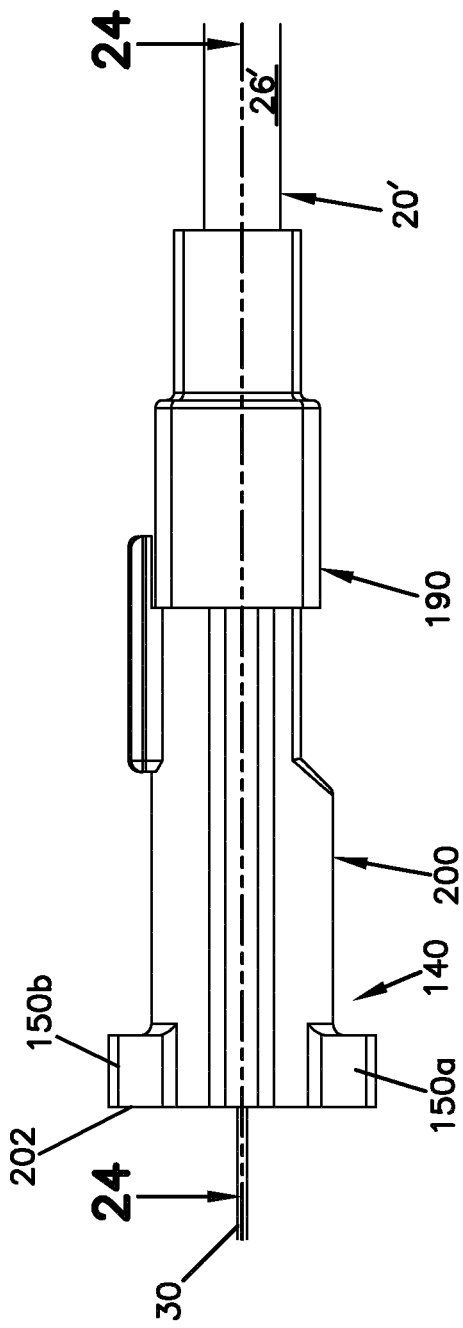
FIG. 22 is a side elevation view of the anchor of FIG. 20 attached to the fiber optic cable.
Figure 23:
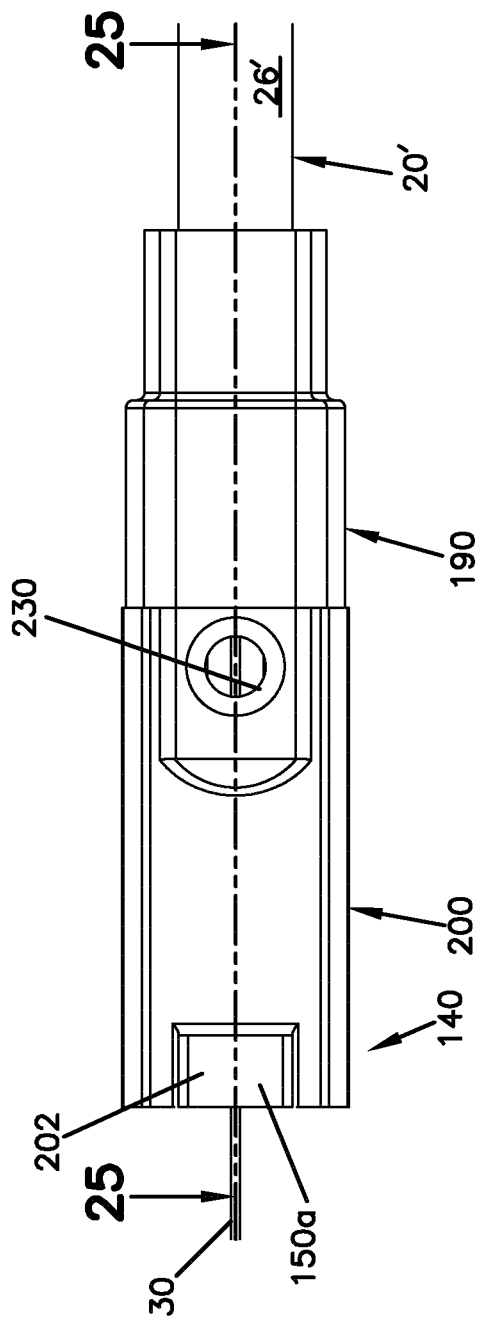
FIG. 23 is a bottom plan view of the anchor of FIG. 20 attached to the fiber optic cable.
Figure 25:
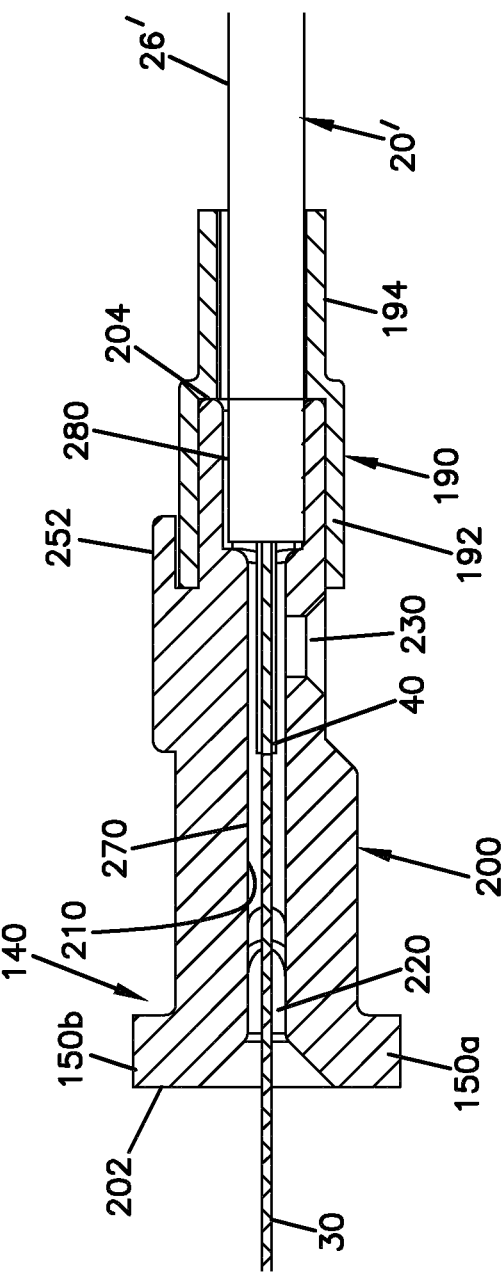
FIG. 25 is a cross-sectional side elevation view of the anchor of FIG. 20, as called out at FIG. 23.
Figure 26A:
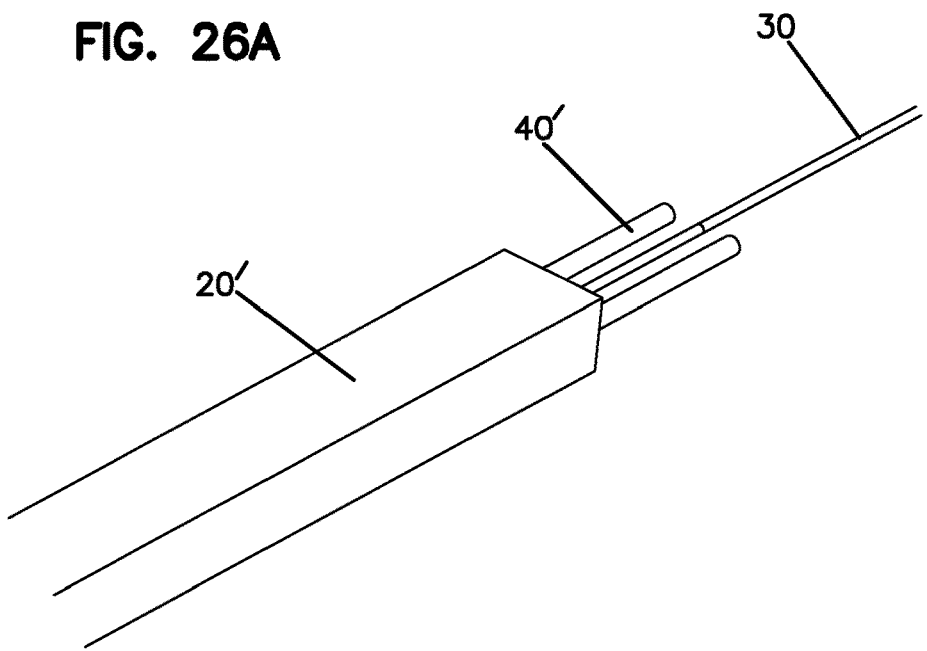
FIGS. 26A through 26F are a series of six perspective views that illustrate an example method of applying the fiber optic connection system of FIG. 18, including the anchor of FIG. 20, to the fiber optic cable of FIG. 20.
Figure 26B:
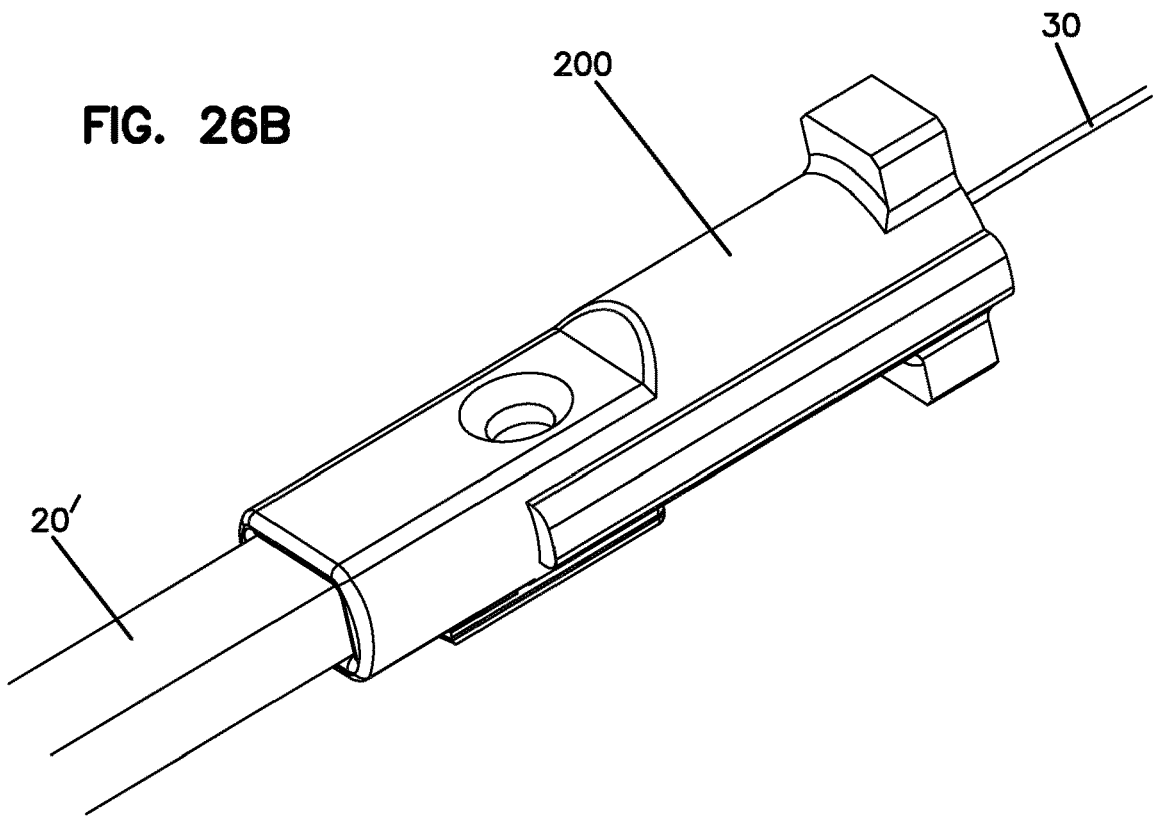
Figure 26C:
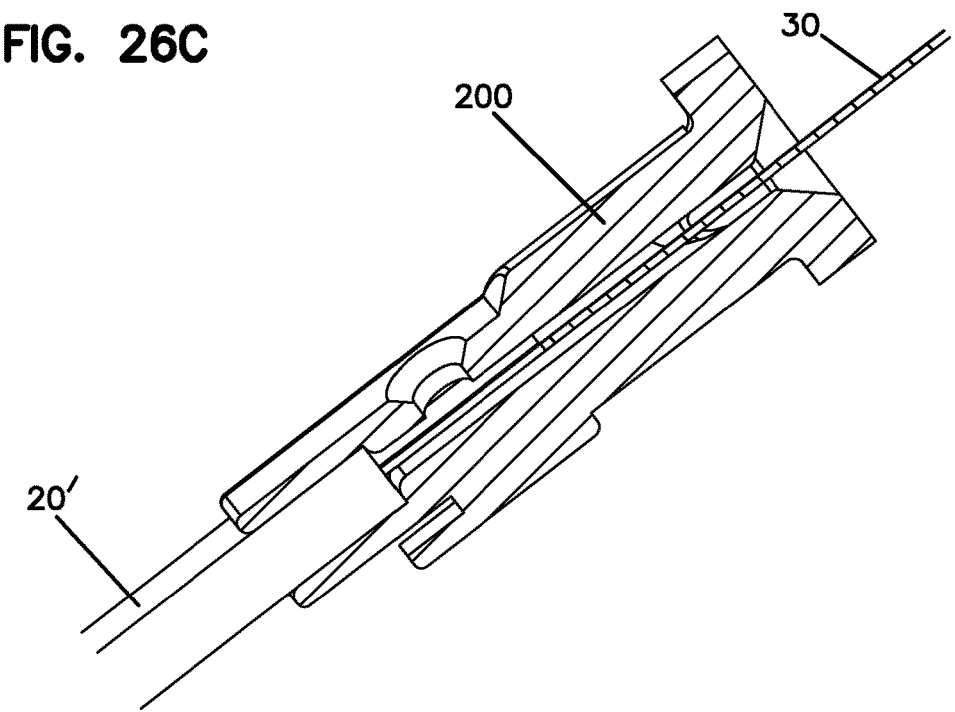
Figure 26D:
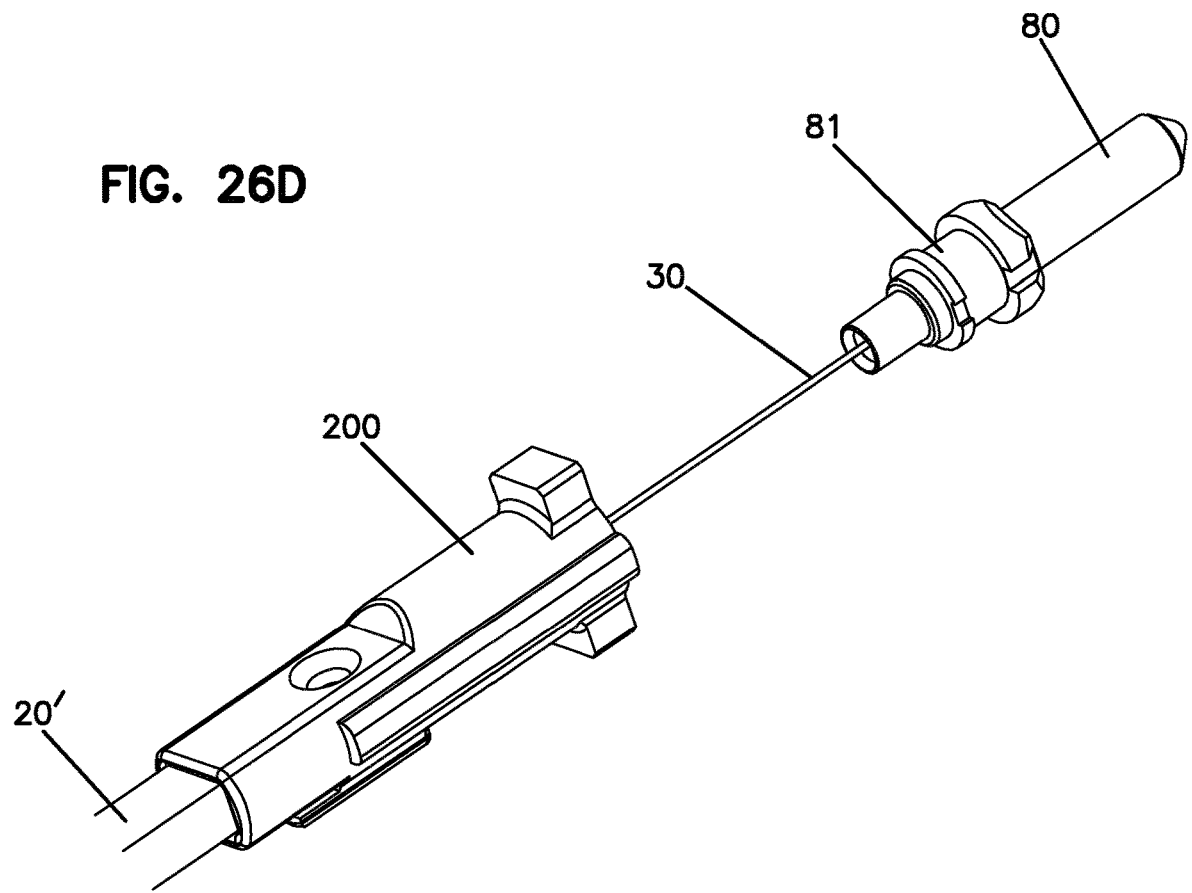
Figure 26E:
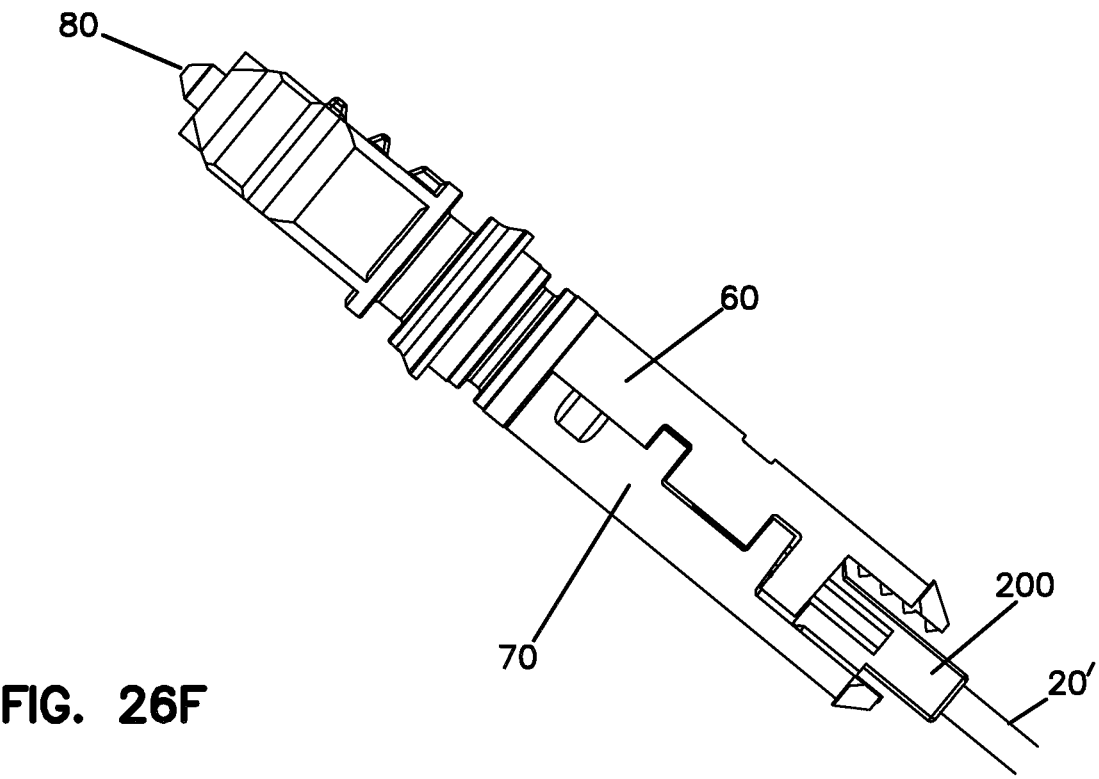
Figure 26F:
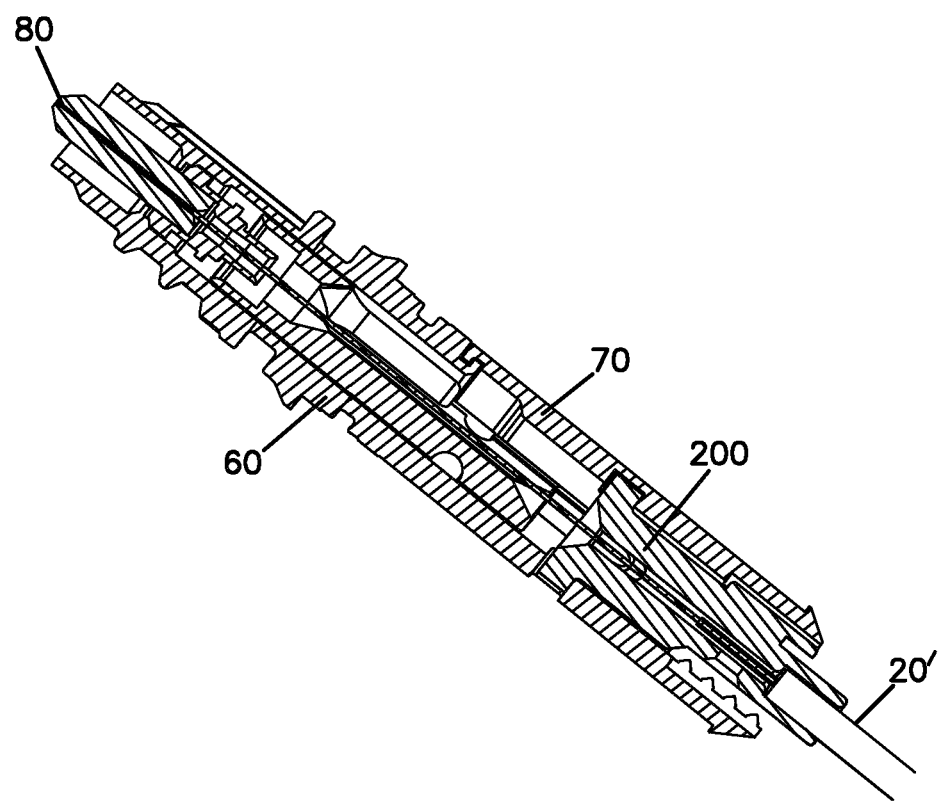

The anchor 200 may further include a shrink wrap receiving area 250. As depicted, the shrink wrap receiving area 250 is on an exterior of the anchor 200 and positioned adjacent the second end 204 of the anchor 200. The cable anchor 200 may further include a finger 252 (see FIGS. 21 and 25). The finger 252 may be adapted to extend over a portion of a shrink tube 190. The shrink tube 190 may be positioned over the shrink wrap receiving area 250 and heat may be applied to the shrink tube 190 to shrink the shrink tube around a perimeter of the jacket 26' of the fiber optic cable 20'. The shrink tube 190 may include a first portion 192 that is adapted to shrink down over the shrink wrap receiving area 250. The shrink tube 190 may include a second portion 194 adapted to shrink down over a portion of the jacket 26' of the fiber optic cable 20'.

In certain embodiments, the fiber optic connector and cable assembly 10, 10' provides strain relief for cables (e.g., 20, 20') with strength members (e.g., 40, 40') of glass and/or metal as well as for yarn of glass and/or aramid material.

The above system may include molded and/or machined parts (e.g., 60, 70, 100, and/or 200). A stripped cable (e.g., 20, 20') may be inserted from one end. The optical fiber (e.g., 30) passes through the anchor 100, 200. Via the port 130, 230 (e.g., a hole), the anchor 100, 200 is filled with epoxy or hot melt. In this way the mechanical carrier (i.e., the strength members 40, 40') are fixated to the anchor 100, 200 (i.e., a cable fixation part). The epoxy and/or hot melt seals the cable (e.g., 20, 20') to the anchor 100, 200. When the ferrule 80 is added, the assembly can be inserted in the housing 50 in such a way that a tuned fiber optic connector can be achieved.

FIGS. 26A-26F illustrate an example of steps of cable termination. In particular, 1) the cable 20, 20' is stripped (see FIG. 26A); 2) the strength members 40, 40' and the optical fiber 30 are inserted into the anchor 100, 200 (see FIGS. 26B and 26C); 3) bonding material 90 (e.g., epoxy and/or hot melt) is injected into the port 130, 230; 4) a ferrule 80 is added to the sub-assembly (see FIG. 26D); 5) the sub-assembly is mounted in the housing 50 (see FIGS. 26E and 26F); and 6) tuning can be done by rotation of the ferrule 80 (e.g., along the axis A1). Friction between the ferrule 80 and/or a ferrule hub 81 and the connector housing 50 may prevent the optical fiber 30 from rotating at the ferrule 80. A multi-position seat between the ferrule 80 and/or a ferrule hub 81 and the connector housing 50 may prevent the optical fiber 30 from rotating at the ferrule 80. The spring 86 may maintain the friction and/or the seat between the ferrule 80 and/or the ferrule hub 81 and the connector housing 50 and thereby maintain the tuning. In certain embodiments, the fiber optic connector and cable assembly 10, 10' may be re-tuned by again rotating the ferrule 80.

In embodiments with the optical fiber 30 fixed to the anchor 100, 200, the anchor 100, 200 may prevent the optical fiber 30 from rotating at the anchor 100, 200.

From the foregoing detailed description, it will be evident that modifications and variations can be made in the devices of the present disclosure without departing from the spirit or scope of the invention.

PARTS LIST

A1 axis
10 fiber optic connector and cable assembly
10' fiber optic connector and cable assembly
20 fiber optic cable
20' fiber optic cable
22 end portion
26 jacket
26' a jacket
28 tube
30 optical fiber
32 end portion
40 strength member
40' strength member
50 connector housing
52 first end
54 second end
56 plug portion
58 passage
60 first housing component
62 receiver
64 proximal extension
66 grooves
68 notches
70 second housing component
72 receiver
78 tabs
80 ferrule
81 hub
82 spring holder
84 tube
86 spring
88 direction
90 bonding material
100 anchor
102 first end
104 second end
110 passage
120 necked-down portion
122 outer taper
124 inner taper
130 injection port
140 attachment portion
150 retention tab
150a retention tab
150b retention tab
160 protrusions
170 main portion
180 cable jacket portion
182 notch
184 annular portion
186 bottom
190 shrink tube
192 first end
194 second end
200 anchor
202 first end
204 second end
210 passage
220 necked-down portion
230 injection port
250 shrink wrap receiving area
252 finger
270 main portion
280 cable jacket portion

What is claimed is:

1. A connectorized cable comprising:
a fiber optic cable comprising an optical fiber and a strength member; and
a fiber optic connector comprising a ferrule and a connector body, the connector body having a front end and a rear end, the strength member of the cable being anchored relative to the connector body adjacent the rear end of the connector body, the ferrule being positioned at the front end of the connector body, a front portion of the fiber being secured within the ferrule;
a spring positioned within the connector body at a location behind the ferrule for biasing the ferrule in a forward direction relative to the connector body, the ferrule being axially moveable in a rearward direction relative to the connector body against the bias of the spring;
the optical fiber being anchored relative to the connector body at a bonding location located rearward of the spring, wherein a bonding material at the bonding location bonds to the optical fiber to prevent the optical fiber from moving axially relative to the connector body at the bonding location, the bonding location including a bonding chamber having a forward end defined by a necked-down portion at which a cross-dimension of the bonding chamber is reduced, wherein the necked-down portion is configured to resist the bonding material from flowing forwardly beyond the forward end of the bonding chamber, the bonding material being contained within the bonding chamber and the optical fiber extending through the bonding chamber and being bonded within the bonding chamber by the bonding material.

2. The connectorized cable of claim 1, wherein the bonding material includes an epoxy.

3. The connectorized cable of claim 1, wherein the strength member includes yarn.

4. The connectorized cable of claim 1, wherein the strength member includes epoxy reinforced glass roving.

5. The connectorized cable of claim 1, wherein the connector body includes a connector housing and an anchor secured to the connector housing, and wherein the bonding chamber is defined by the anchor.

6. The connectorized cable of claim 5, wherein the optical fiber and the strength member are bonded to the anchor within the bonding chamber.

7. The connectorized cable of claim 1, wherein the connector body defines an axial passage defined in part by the bonding chamber, and wherein the necked-down portion is configured to center the optical fiber within the axial passage.

8. The connectorized cable of claim 1, wherein the strength member is bonded within the bonding chamber.

9. The connectorized cable of claim 8, wherein the strength member includes Aramid yarn bonded within the bonding chamber.

10. The connectorized cable of claim 1, wherein the necked-down region includes a restriction at which the cross-dimension of the bonding chamber is reduced, and wherein the necked-down region includes tapers located forward and rearward of the restriction that are configured to converge toward the restriction.

11. A connectorized cable comprising:
  a fiber optic cable comprising an optical fiber and a strength member; and
  a fiber optic connector comprising a ferrule and a connector housing, the connector housing having a front end and a rear end, the strength member of the cable being anchored relative to the connector housing adjacent the rear end of the connector housing, the ferrule being positioned at the front end of the connector housing, the optical fiber extending axially through the connector housing with a front portion of the fiber being secured within the ferrule;
  a spring positioned within the connector housing at a location behind the ferrule for biasing the ferrule in a forward direction relative to the connector housing, the ferrule being axially moveable in a rearward direction relative to the connector housing against the bias of the spring; and
  the optical fiber being anchored relative to the connector housing at a bonding chamber located rearward of the spring, the bonding chamber containing bonding material, the bonding chamber having a forward end defined by a necked-down portion at which a cross-dimension of the bonding chamber is reduced, wherein the necked-down portion is configured to resist the bonding material from flowing forwardly beyond the forward end of the bonding chamber during introduction of the bonding material into the bonding chamber, the optical fiber extending through the bonding chamber and the necked-down portion, the optical fiber and the strength member being axially fixed relative to the connector housing at the bonding chamber.

12. The connectorized cable of claim 11, wherein the necked-down portion has a tapered lead-in or a tapered exit.

13. The connectorized cable of claim 11, further comprising a radial opening for introducing the bonding material radially into the bonding chamber from a location outside the connector housing.

14. The connectorized cable of claim 11, further comprising an anchor secured at least partially within the connector housing adjacent the rear end of the connector housing, the anchor defining the bonding chamber and the necked-down portion.

15. The connectorized cable of claim 14, wherein the fiber optic cable includes a cable jacket surrounding the optical fiber and the strength member, and wherein the anchor defines a rear pocket for receiving a front end of the cable jacket.

16. The connectorized cable of claim 11, wherein optical fiber is not axially fixed relative to the connector housing at a region axially between the bonding chamber and a rear end of the ferrule.

17. The connectorized cable of claim 11, wherein the strength member includes a first strength member and a second strength member aligned along a plane, wherein the optical fiber is positioned between the first and second strength members within the bonding chamber.

18. A connectorized cable comprising:
  a fiber optic cable comprising an optical fiber and a strength member; and
  a fiber optic connector comprising a ferrule and a connector housing, the connector housing having a front end and a rear end, the strength member of the cable being anchored relative to the connector housing adjacent the rear end of the connector housing, the ferrule being positioned at the front end of the connector housing, the optical fiber extending axially through the connector housing with a front portion of the fiber being secured within the ferrule;
  a spring positioned within the connector housing at a location behind the ferrule for biasing the ferrule in a forward direction relative to the connector housing, the ferrule being axially moveable in a rearward direction relative to the connector housing against the bias of the spring;
  an anchor assembled at least partially within the connector housing adjacent the rear end of the connector housing, the anchor being axially fixed relative to the connector housing, the anchor defining a bonding chamber containing bonding material, the bonding chamber having a forward end at which a cross-dimension of the bonding chamber is reduced to resist the bonding material from flowing forwardly beyond the forward end of the bonding chamber during introduction of the bonding material into the bonding chamber;
  the optical fiber extending through the bonding chamber and the forward portion of the anchor and being axially fixed relative to the anchor within the bonding chamber; and
  the strength member having a forward end portion secured within the bonding chamber of the anchor by the bonding material.

19. The connectorized cable of claim 18, wherein the anchor defines a radial opening for introducing the bonding material radially into the bonding chamber.

20. The connectorized cable of claim 18, wherein the fiber optic cable includes a cable jacket surrounding the optical fiber and the strength member, and wherein the anchor defines a rear pocket for receiving a front end of the cable jacket.

21. The connectorized cable of claim 18, wherein optical fiber is not axially fixed relative to the connector housing at a region axially between the anchor and a rear end of the ferrule.

22. The connectorized cable of claim 18, wherein the strength member includes a first strength member and a second strength member aligned along a plane, wherein second strength member has a forward end portion, wherein the forward end portions of the first and second strength members are positioned within the bonding chamber and secured to the anchor by the bonding material, and wherein the optical fiber is secured between the forward end portions of the first and second strength members within the bonding chamber.

* * * * *